(12) United States Patent
Satoh et al.

(10) Patent No.: US 9,430,283 B2
(45) Date of Patent: Aug. 30, 2016

(54) INFORMATION PROCESSING APPARATUS AND JOB SCHEDULING METHOD

(71) Applicant: FUJITSU LIMITED, Kawasaki-shi, Kanagawa (JP)

(72) Inventors: Takashi Satoh, Kasugai (JP); Tamotsu Sengoku, Kasugai (JP); Hiroyuki Hatsushika, Mizunami (JP); Yuuji Nomoto, Nagoya (JP)

(73) Assignee: FUJITSU LIMITED, Kawasaki (JP)

( * ) Notice: Subject to any disclaimer, the term of this patent is extended or adjusted under 35 U.S.C. 154(b) by 76 days.

(21) Appl. No.: 14/304,030

(22) Filed: Jun. 13, 2014

(65) Prior Publication Data
US 2015/0026693 A1 Jan. 22, 2015

(30) Foreign Application Priority Data
Jul. 22, 2013 (JP) .................................. 2013-151280

(51) Int. Cl.
*G06F 9/46* (2006.01)
*G06F 9/48* (2006.01)

(52) U.S. Cl.
CPC .............. *G06F 9/4881* (2013.01); *G06F 9/468* (2013.01); *G06F 9/48* (2013.01)

(58) Field of Classification Search
CPC ......... G06F 9/4881; G06F 9/48; G06F 9/468
See application file for complete search history.

(56) References Cited

U.S. PATENT DOCUMENTS

2005/0066330 A1* 3/2005 Kanai ................... G06F 1/3203 718/102

FOREIGN PATENT DOCUMENTS

| JP | 5-88917 | 4/1993 |
|---|---|---|
| JP | 2004-295731 | 10/2004 |
| JP | 2009-43188 | 2/2009 |
| JP | 2010-231694 | 10/2010 |
| JP | 2011-43968 | 3/2011 |

* cited by examiner

*Primary Examiner* — Camquy Truong
(74) *Attorney, Agent, or Firm* — Staas & Halsey LLP

(57) ABSTRACT

An information processing apparatus includes a storage unit and a processing unit. The storage unit is configured to store therein a first execution time and a second execution time longer than the first execution time. The first execution time is a time expected to be taken to execute a first job included in a first job group. The processing unit is configured to determine in which time period an execution start time of the first job is included. The execution start time is a time at which execution of the first job is to be started. The processing unit is configured to select, as a predicted execution time of the first job, one of the first execution time and the second execution time based on a result of the determination. The processing unit is configured to perform scheduling of the first job group based on the predicted execution time.

10 Claims, 26 Drawing Sheets

| MEMBER | MEANING |
|---|---|
| version | VERSION INFORMATION |
| dbsize | TABLE SIZE |
| tasknet name | JOB NAME |
| tasknet comment | COMMENT |
| tasknet start time | EXECUTION START TIME OF JOB |
| tasknet end time | END TIME OF JOB |
| Start mode | EXECUTION CONDITION |
| Exec hour | PREDICTED EXECUTION TIME (HOUR) WHEN SINGLE JOB IS EXECUTED |
| Exec min | PREDICTED EXECUTION TIME (MINUTE) WHEN SINGLE JOB IS EXECUTED |
| Start hour | PREDICTED EXECUTION TIME (HOUR) WHEN JOBS ARE EXECUTED MULTIPLE TIMES |
| Start min | PREDICTED EXECUTION TIME (MINUTE) WHEN JOBS ARE EXECUTED MULTIPLE TIMES |
| Exec ymd | EXECUTION DATE INFORMATION OF JOB |
| Peak exec ymd | EXECUTION DATE INFORMATION AT PEAK |

| MEMBER | MEANING |
|---|---|
| task command | COMMAND NAME OF JOB |
| task pathname | DIRECTORY OF JOB |
| job comment | COMMENT |
| microJES id | JOB NAME |
| ~ | |
| task number | JOB NUMBER |
| previous task num | PRECEDING JOB NUMBER |
| ~ | |
| Sys multi num | SYSTEM MULTIPLICITY |
| Prev start time | START TIME OF PREVIOUS EXECUTION |
| Prev end time | END TIME OF PREVIOUS EXECUTION |
| Prev exec time | EXECUTION RESULT TIME OF PREVIOUS EXECUTION |
| exec time | EXECUTION RESULT (PREDICTION) TIME |
| Peak exec time | PREDICTED EXECUTION TIME ON PEAK EXECUTION DATE |
| criticalpath flg | PRESENCE OR ABSENCE OF JOB ON CRITICAL PATH<br>ON: PRESENCE OF JOB ON CRITICAL PATH<br>OFF: ABSENCE OF JOB ON CRITICAL PATH |
| priority job | EXECUTION PRIORITY OF JOB |
| extension time | GRACE TIME UP TO EXECUTION |

FIG. 6

| JOB NAME | START TIME OF PREVIOUS EXECUTION | END TIME OF PREVIOUS EXECUTION | EXECUTION RESULT TIME (PREDICTED EXECUTION TIME) OF PREVIOUS EXECUTION | PREDICTED EXECUTION TIME ON PEAK EXECUTION DATE | PEAK EXECUTION DATE INFORMATION |
|---|---|---|---|---|---|
| JOB#A | 00:00 | 00:05 | 00:05 | 00:10 | 2013-1-4, 2013-2-28... |
| JOB#B | 00:05 | 00:10 | 00:05 | 00:20 | 2013-1-4, 2013-1-11... |
| JOB#C | 00:05 | 00:10 | 00:05 | 00:20 | 2013-1-4, 2013-1-6... |
| JOB#D | 00:10 | 00:15 | 00:05 | 00:10 | 2013-1-4, 2013-1-11... |
| JOB#E | 00:00 | 00:05 | 00:05 | 00:10 | 2013-1-11, 2013-1-12... |
| JOB#F | 00:10 | 00:20 | 00:10 | — | — |

| JOB NAME | SCHEDULED START TIME | SCHEDULED END TIME | INTEGRATED TIME | PRESENCE OR ABSENCE ON CRITICAL PATH | PRIORITY |
|---|---|---|---|---|---|
| JOB#A | 00:00 | 00:10 | 00:40 | PRESENCE | HIGH |
| JOB#B | 00:10 | 00:30 | 00:30 | PRESENCE | HIGH |
| JOB#C | 00:10 | 00:30 | 00:30 | PRESENCE | HIGH |
| JOB#D | 00:30 | 00:40 | 00:10 | PRESENCE | HIGH |
| JOB#E | 00:00 | 00:05 | 00:15 | ABSENCE | LOW |
| JOB#F | 00:05 | 00:15 | 00:10 | ABSENCE | LOW |

INFORMATION PROCESSING APPARATUS AND JOB SCHEDULING METHOD

CROSS-REFERENCE TO RELATED APPLICATION

This application is based upon and claims the benefit of priority of the prior Japanese Patent Application No. 2013-151280, filed on Jul. 22, 2013, the entire contents of which are incorporated herein by reference.

FIELD

The embodiments discussed herein are related to an information processing apparatus and a job scheduling method.

BACKGROUND

In a system formed by a server, a storage, a network, and the like which are operated by execution of an operating system (OS), middleware, and an application program, job scheduling for automating and operating a job is performed.

In a case of executing a job so as to conduct certain business, a time limit for the end of execution of the job is typically set. For example, in a system of a bank or the like, a job which is executed at night is desired to be finished by a start time of online business. In automation of a job, job scheduling with consideration for such an execution end time is performed.

As a related art of job scheduling, for example, a technique has been proposed in which a scheduled process time for a job scenario is executed is calculated by using reference multiplicity and scheduled multiplicity.

In addition, a technique has been proposed in which a critical path which influences a start time of a specific job is determined, and a job on the critical path is given a higher priority when a predicted end time of the specific job is later than a target end time.

Further, a technique has been proposed in which batch jobs and an execution schedule thereof are acquired; only a batch job in a certain load level is executed; and the next batch job is not executed until execution of the batch job ends.

Further, a technique has been proposed in which a critical path is found by performing forward search between a start point job and an end point job, and a critical path is found by performing backward search of specific jobs from the end point job. When the critical paths are different between forward and backward directions, execution duration is calculated with the critical path having the longer execution duration as a normal critical path.

Related techniques are disclosed in, for example, Japanese Laid-open Patent Publication No. 2010-231694, Japanese Laid-open Patent Publication No. 2004-295731, Japanese Laid-open Patent Publication No. 2011-043968, and Japanese Laid-open Patent Publication No. 2009-043188.

As mentioned above, typically, since there is a deadline in an operation of a job, scheduling is performed by predicting an execution end time of the job, but an execution time of the job varies depending on the date and time, and the like. For example, there is a case where such a time period that the time taken to execute a job is lengthened occurs in a certain cycle.

In that case, in the time period when execution of the job is lengthened, if job scheduling is performed by predicting the job execution in a fixed manner based on only an average time or the like, the job execution is delayed, and thus there is a problem in that the business may not be finished within the deadline.

SUMMARY

According to an aspect of the present invention, provided is an information processing apparatus including a storage unit and a processing unit. The storage unit is configured to store therein a first execution time and a second execution time longer than the first execution time. The first execution time is a time expected to be taken to execute a first job included in a first job group. The processing unit is configured to determine in which time period an execution start time of the first job is included. The execution start time is a time at which execution of the first job is to be started. The processing unit is configured to select, as a predicted execution time of the first job, one of the first execution time and the second execution time based on a result of the determination. The processing unit is configured to perform scheduling of the first job group based on the predicted execution time. The processing unit is at least one of a computer processor or an electronic circuit.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating a configuration example of a job flow definition table;

FIG. 5 is a diagram illustrating a configuration example of a job definition table;

FIG. 6 is a diagram illustrating a configuration example of an execution result time table;

FIG. 8 is a diagram illustrating a configuration example of a priority setting table;

DESCRIPTION OF EMBODIMENTS

Figure 1:
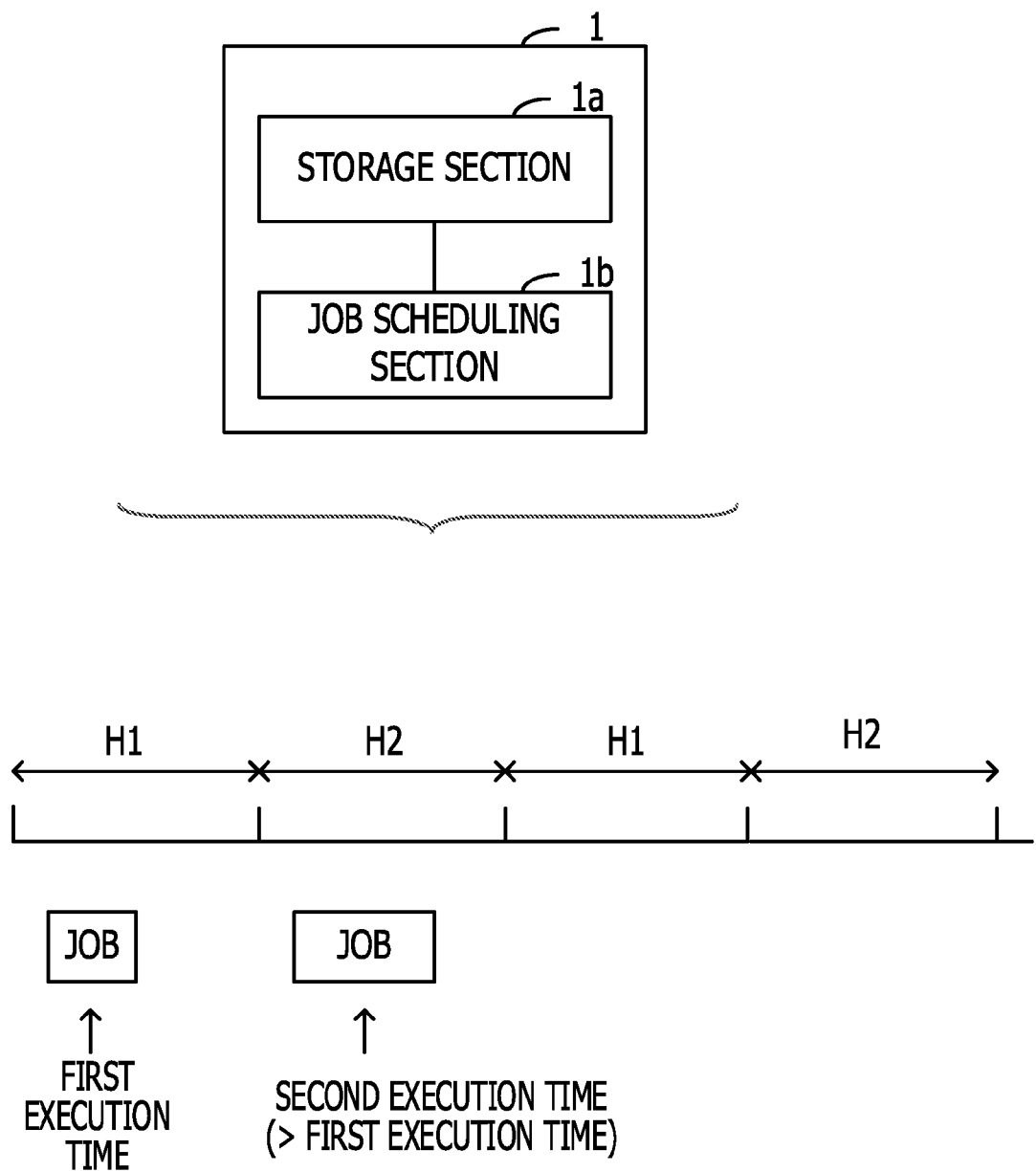
FIG. 1 is a diagram illustrating a configuration example of an information processing apparatus.

Hereinafter, the embodiments will be described with reference to the drawings. FIG. 1 is a diagram illustrating a configuration example of an information processing apparatus. An information processing apparatus 1 includes a storage section is and a job scheduling section 1b.

The storage section is stores a first execution time taken to execute a job and a second execution time longer than the first execution time. The job scheduling section 1b determines whether or not an execution start time of a job is included in a specific time period, selects the first execution time or the second execution time, and performs scheduling of the job based on the selected execution time.

Time periods include a time period H1 (first time period) and a time period H2 (second time period). The time period H2 is a time period in which the time taken to execute a single job is longer than in the time period H1. The time period H2 occurs in a certain cycle. For example, the time period H1 corresponds to normal days when business is conducted at an average level, and the time period H2 corresponds to peak days when business is busier than that of the normal days.

The job scheduling section 1b selects the first execution time as an execution time of a job when an execution start time of the job is included in the time period H1. In other words, the first execution time (shorter than the second execution time) is selected for a job executed in the time period H1.

In addition, the job scheduling section 1b selects the second execution time as an execution time of a job when an execution start time of the job is included in the time period H2. In other words, since a job executed in the time period H2 has execution duration longer than that of the job executed in the time period H1, the second execution time longer than the first execution time is selected.

In the related art, there is a case where job execution is delayed since job scheduling is performed by assigning a fixed execution time, which is initially predicted, to a job whose execution time varies.

In contrast, the job scheduling section 1b determines whether or not execution of a job starts in a time period when an execution time of the job seems to be lengthened. The job scheduling section 1b recognizes a variation in execution duration of the job, and adaptively selects one of the first execution time and the second execution time, duration of which are different from each other, thereby performing scheduling of the job. Accordingly, flexible job scheduling may be performed in accordance with variations in the job execution time, and thus it is possible to minimize delay of job execution.

Next, a problem to be addressed will be described prior to description of a configuration and an operation according to the present embodiment. In an automatic operation of a job, scheduling is often performed so as to execute the job in a cyclic manner, such as daily batch (for example, 17:00 every day) or weekly batch (for example, every Friday).

In this case, a data amount which is handled for an execution process of a job varies depending on the date when the job is executed even in the same time slot or day of the week, and thus an execution time of the job also varies.

For example, if the completion day of one month is the 20th day of the month, the 19th day of every month is a very busy day in the job process. As above, there is a case where such a time period that the time taken to execute a job is lengthened occurs in a certain cycle.

When job scheduling is performed, with a fixed execution time which is initially predicted, for the job whose execution time varies, there is a case where a deviation from a practical execution time occurs, and thus job execution is delayed.

If scheduling is performed so as to be suitable for the execution date when a job is executed in the longest time, a margin is generated in a server resource for executing the job on the execution date when the job is executed in a short time, and thus the server resource is not used efficiently.

In a case where many jobs are executed, a critical path is set which is a path in which an entire execution time of a job flow is the longest, and job scheduling is performed so that a job on the critical path is executed preferentially to a job which is not present on the critical path.

However, an execution time of a job varies depending on the execution date of the job as described above. Accordingly, if a critical path is determined in accordance with a predicted execution time in an initial job scheduling plan and a job is executed based on priorities of jobs on the critical path, an execution time of an entire job flow is delayed in a case where the execution time varies. In the present embodiment, these points are considered and the above problems are addressed.

Hereinafter, a configuration and an operation of a job management server including the function of the information processing apparatus 1 will be described in detail.

Figure 2:
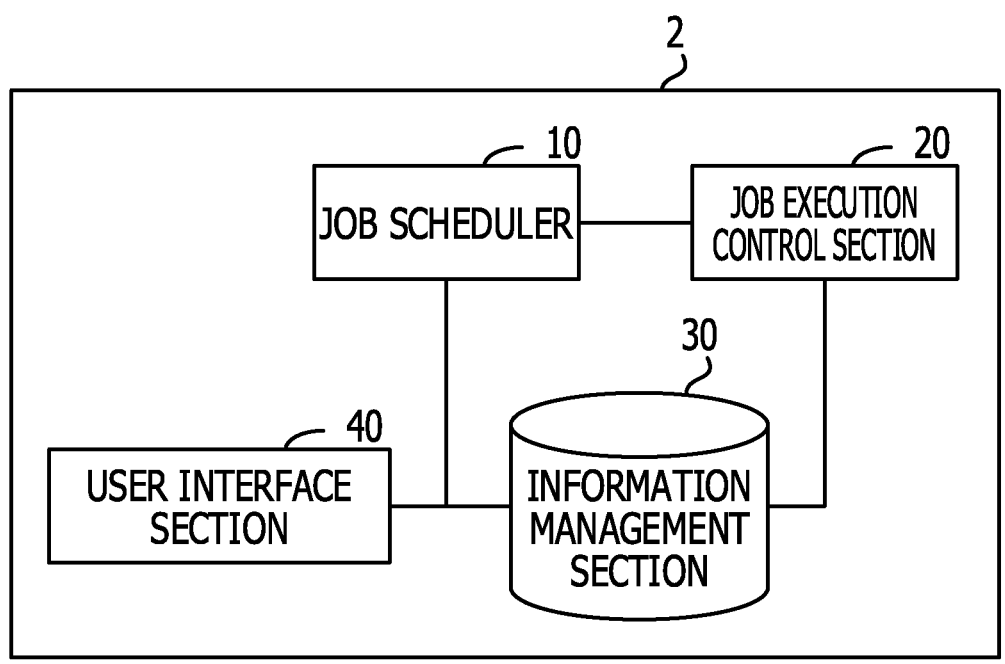
FIG. 2 is a diagram illustrating a configuration example of a job management server.

FIG. 2 is a diagram illustrating a configuration example of a job management server. A job management server 2 includes a job scheduler 10, a job execution control section 20, an information management section 30, and a user interface section 40. The information management section 30 includes the function of the storage section is of FIG. 1, and the job scheduler 10 includes the function of the job scheduling section 1b of FIG. 1.

The job scheduler 10 performs scheduling of a job. The job execution control section 20 executes the job based on the job scheduling. The information management section 30 performs registration and management of various pieces of information regarding execution of the job. The user interface section 40 is connected to an external terminal to perform a user interface process, and performs communication with the external terminal.

Figure 3:
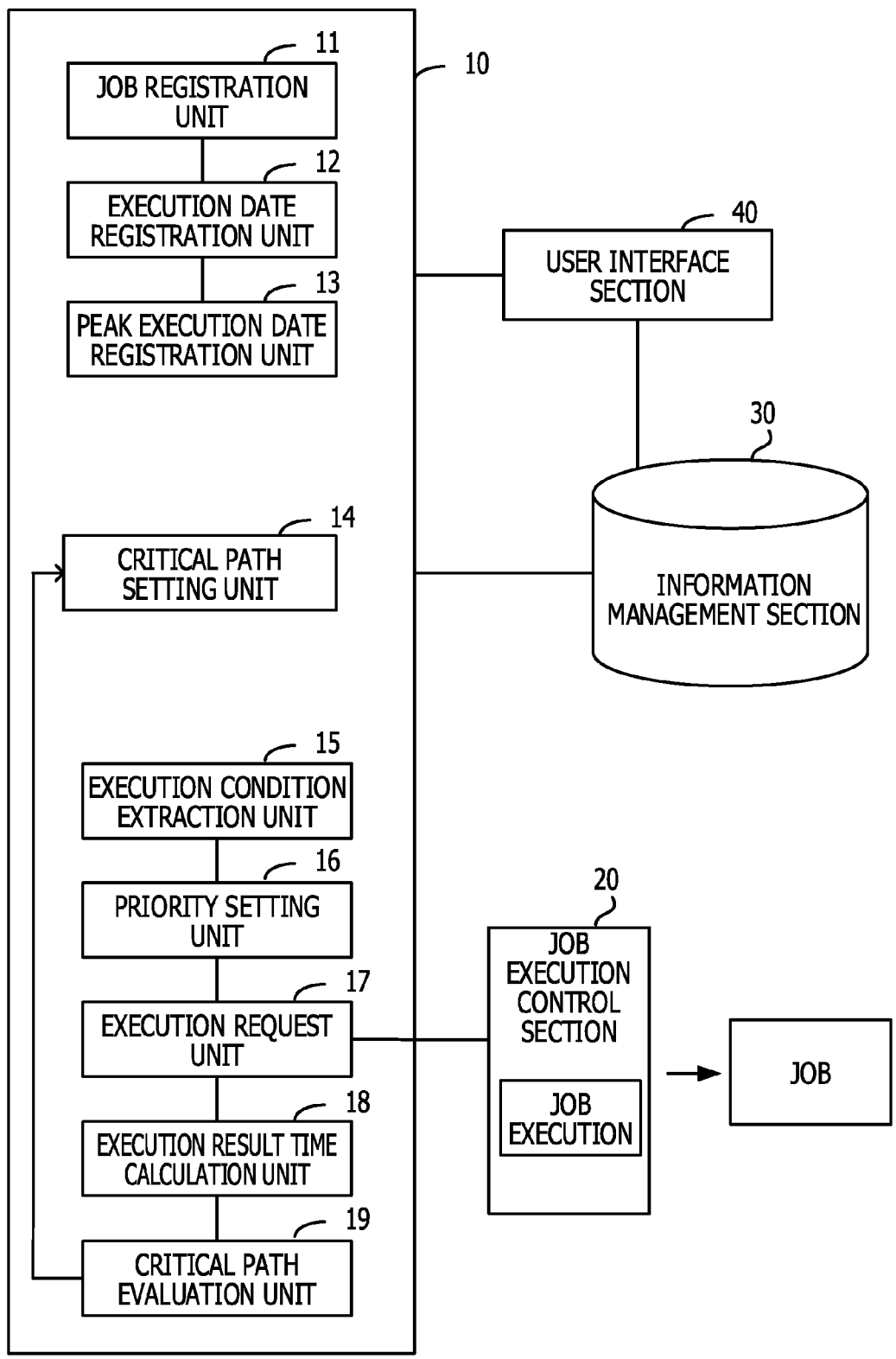
FIG. 3 is a diagram illustrating a configuration example of a job scheduler.

FIG. 3 is a diagram illustrating a configuration example of the job scheduler. The job scheduler 10 includes a job registration unit 11, an execution date registration unit 12, a peak execution date registration unit 13, a critical path setting unit 14, an execution condition extraction unit 15, a priority setting unit 16, an execution request unit 17, an execution result time calculation unit 18, and a critical path evaluation unit 19.

The job registration unit 11 performs registration of a job which is to be executed. The execution date registration unit 12 registers the date (execution date) when a job is executed. The peak execution date registration unit 13 registers the peak execution date which is the execution date of a job when business peaks. The execution date and peak execution date may be set arbitrarily from a user via user interface section 40.

The critical path setting unit 14 sets a critical path of a job flow having a scheduled end time. The execution condition extraction unit 15 extracts an execution condition of a job. The priority setting unit 16 compares system multiplicity with the number of executed jobs at a start time or end time of a job, and determines a priority of a job to be executed. The system multiplicity is an upper limit number of jobs allowed to be executed concurrently. The priority setting unit 16 sets a priority of a job present on the critical path to be higher than a priority of a job which is not present on the critical path.

The execution request unit 17 requests the job execution control section 20 to execute jobs in a descending order of priority. A job which is requested to be executed is executed by the job execution control section 20, and, if the execution of the job ends, a completion response is transmitted from the job execution control section 20 to the execution request unit 17.

The execution result time calculation unit 18 acquires a start time and an end time of job execution, respectively, when the job is executed and the execution of the job ends, and calculates a difference between the start time and the end time so as to calculate an execution result time. The critical path evaluation unit 19 evaluates, at a start time or an end time of a job, whether or not a currently set critical path is the most delayed path based on a comparison result of predicted execution times of jobs. If the currently set critical path is not the most delayed path, the critical path evaluation unit 19 transmits an instruction for setting a new critical path to the critical path setting unit 14.

Next, a job flow definition table T1 and a job definition table T2 included in the information management section 30 will be described.

FIG. 4 is a diagram illustrating a configuration example of the job flow definition table. The job flow definition table T1 registers therein definition information regarding a job flow (job net) which is a group of a plurality of jobs whose execution order is designated.

The job flow definition table T1 includes "version", "dbsize", "tasknet name", "tasknet comment", "tasknet start time", "tasknet end time", "Start mode", "Exec hour", "Exec min", "Start hour", "Start min", "Exec ymd", and "Peak Exec ymd", as table members.

The "version" indicates version information, the "dbsize" indicates a table size, the "tasknet name" indicates a job name, the "tasknet comment" indicates a comment, the "tasknet start time" indicates an execution start time of a job, and the "tasknet end time" indicates an end time of a job.

The "Start mode" indicates an execution condition, the "Exec hour" indicates a predicted execution time (hour) when a single job is executed, the "Exec min" indicates a predicted execution time (minute) when a single job is executed, and the "Start hour" indicates a predicted execution time (hour) when jobs are executed multiple times.

The "Start min" indicates a predicted execution time (minute) when jobs are executed multiple times, the "Exec ymd" indicates the execution date (the normal execution date) of a job, and the "Peak Exec ymd" indicates the peak execution date of a job.

FIG. 5 is a diagram illustrating a configuration example of the job definition table. The job definition table T2 includes "task command", "task pathname", "job comment", "microJES id", "task number", "previous task num", "Sys multi num", "Prev start time", "Prev end time", "Prev exec time", "exec time", "Peak exec time", "criticalpath flg", "priority job", and "extension time", as table members.

The "task command" indicates a command name of a job, the "task pathname" indicates a directory of a job, the "job comment" indicates a comment of a job, the "microJES id" indicates a job name, the "task number" indicates a job number, and the "previous task num" indicates a preceding job number.

The "Sys multi num" indicates the system multiplicity, the "Prev start time" indicates a start time of the previous execution, the "Prev end time" indicates an end time of the previous execution, the "Prev exec time" indicates an execution result time of the previous execution, and the "exec time" indicates an execution result (prediction) time.

The "Peak exec time" indicates a predicted execution time on the peak execution date, the "criticalpath flg" indicates presence or absence of a job on a critical path, the "priority job" indicates a priority of a job, and the "extension time" indicates a grace time up to execution.

In the above-described attributes, the "Sys multi num" may be set by a user. The "Prev start time" indicates a start time of job execution when a job is executed in the previous time. The "Prev end time" indicates an end time of job execution when a job is executed in the previous time.

The "Prev exec time" is a difference obtained by subtracting the "Prev start time" from the "Prev end time". The "exec time" indicates a prediction time of the next execution, which is predicted based on the "Prev exec time" or the "Peak exec time" as described later.

The "Peak exec time" indicates a predicted execution time taken to execute a job on the peak execution date. In the "criticalpath flg", ON indicates a job which is present on the critical path, and OFF indicates a job which is not present on the critical path.

The "priority job" is set in a range of 0 to 64 as an example, and a standard value is 31. A job on a critical path is given a higher priority (further given a higher priority in a case where delay is expanded).

A priority of a job which is not present on the critical path is fundamentally set to a standard value. However, the priority is lowered in a case where resource deficiency (deficiency in multiplicity or the like) of a system is predicted in a scheduled execution time slot. A priority is lowered in a range in which there is a margin in a grace time, and the priority is raised as the grace time is up.

The "extension time" is set to a value obtained by subtracting a predicted execution time of a job from time left over to an end time of the critical path or a scheduled end time (deadline). An execution time of a job may be delayed in a range of the grace time.

Next, a description will be made of a registration process of an execution result time and a predicted execution time of a job. FIG. 6 is a diagram illustrating a configuration example of an execution result time table. The information management section 30 includes an execution result time table T3.

The execution result time table T3 has items such as a job name, a start time of the previous execution, an end time of the previous execution, an execution result time of the previous execution, a predicted execution time on the peak execution date, and peak execution date information. Hereinafter, a job may be referred to by a job name thereof.

In job#D, for example, an execution start time of the previous execution is 00:10, and an end time is 00:15. Therefore, an execution result time of the previous execution is 5 minutes (=00:15−00:10). The peak execution date information indicates Jan. 4 and Jan. 11, 2013, and a predicted execution time on the peak execution date is 10 minutes.

Since a predicted execution time on the peak execution date is longer than an execution result time of the normal execution date which is not the peak date, in a case of job#D, the predicted execution time on the peak execution date is 5 minutes (=10 minutes−5 minutes) longer than the execution result time of the normal execution date.

The execution result time calculation unit 18 of the job scheduler 10 calculates a difference between a start time and an end time of a job, and updates the "Prev exec time" of the job definition table T2 to the calculated value in a case where the execution date of the job does not match the peak execution date (in a case where the execution date is the normal execution date).

In a case where the execution date of the job matches the peak execution date, the execution result time calculation unit 18 compares the calculated value with the "Peak exec time" of the job definition table T2.

In a case where the calculated value is greater than a value of the "Peak exec time" which has already been set, the execution result time calculation unit 18 updates the "Peak exec time" to a value (for example, any value set by a user) greater than the calculated value. In a case where the value of the "Peak exec time" which has already been set is greater than the calculated value, the value of the "Peak exec time" is maintained.

As mentioned above, the job management server 2 updates the "Prev exec time" and "Peak exec time" in accordance with execution time of a job on a past normal execution date and peak execution date, respectively, of which scheduling is periodically performed.

As mentioned above, information on periodicity is given to the definition of a job as a timing when data increases, such as an end of the period or the weekend for each type of business, and thus an execution time may be predicted with high accuracy just through comparison with a previous result time. In addition, execution time of all jobs may be substantially estimated in advance, and thus a critical path may be set with high accuracy.

Although the "Peak exec time" is input from a user in the above description, the "Peak exec time" may also be obtained by executing a program for acquiring, as statistical information, a result of job execution during a predetermined time period and obtaining periodicity of a business peak.

In relation to a predicted execution time of a job (for example, immediately after a job definition, immediately after changing a job definition, or the like) which has never been executed, a default value (10 minutes for example) may be set in advance for the entire system and employed.

Next, a critical path will be described. In job scheduling, an entire execution time (time taken to execute jobs including a starting job to a final job) of a job flow is calculated. At this time, a route in which an entire execution time is the maximum among a plurality of job flows becomes a critical path.

A job which is not present on a critical path does not influence a schedule of entire business even if execution thereof is delayed, as long as the delay is in a marginal range. In contrast, if execution of a job on the critical path is delayed, a deadline of the entire business is delayed. Conversely, if the critical path is shortened, a working period may also be shortened.

Figure 7:
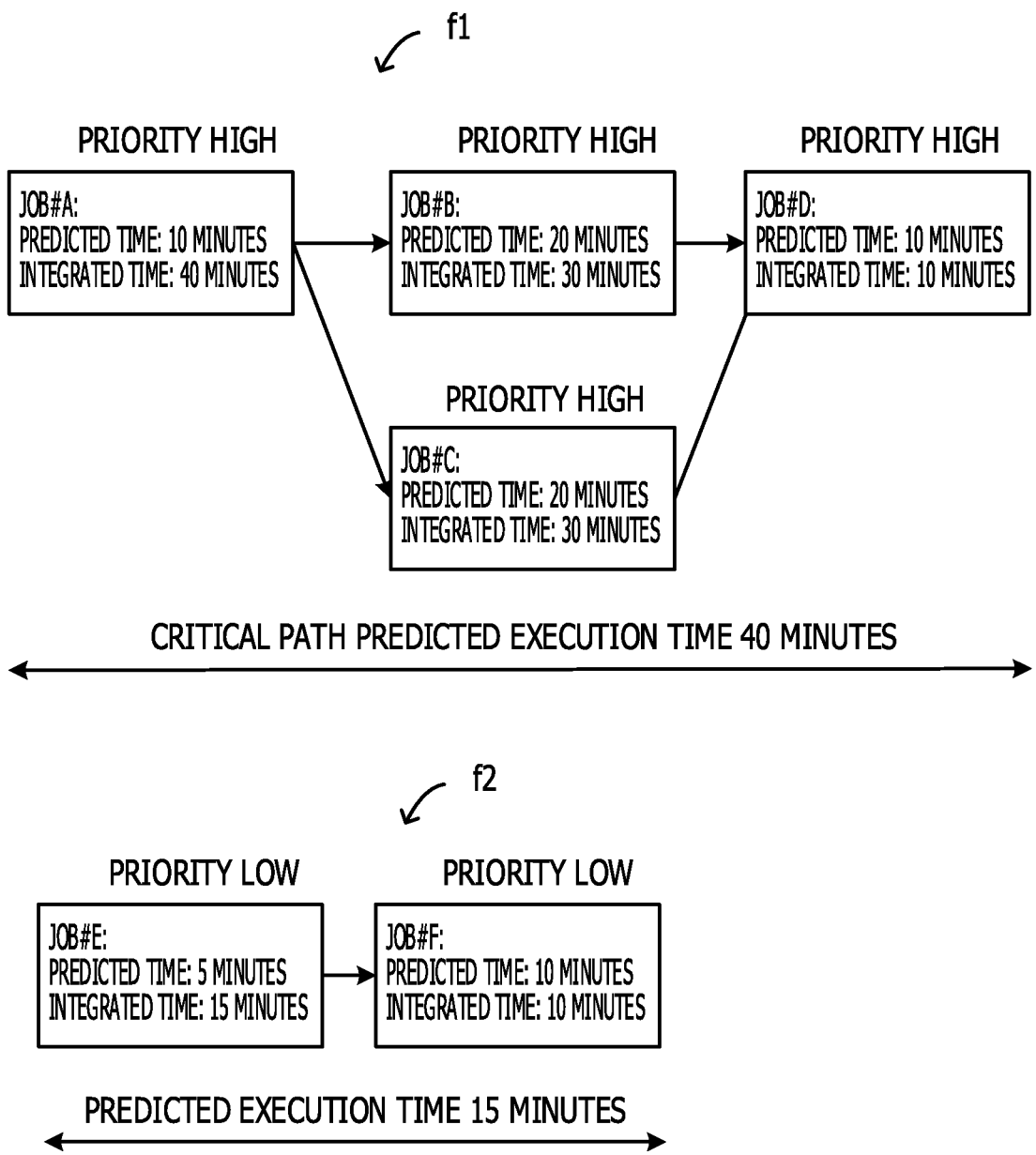
FIG. 7 is a diagram illustrating a job flow of a critical path and a job flow of a path which is not a critical path.

FIG. 7 is a diagram illustrating a job flow of a critical path and a job flow of a path which is not a critical path. A job flow f1 includes job#A, job#B, job#C, and job#D. Job#A is a starting job, and job#D is a final job. The intervening job#B and job#C are jobs which are executed in parallel (concurrently in duplex).

Assuming that predicted execution times of job#A, job#B, job#C, and job#D are respectively 10 minutes, 20 minutes, 20 minutes, and 10 minutes, job#B and job#C are executed in parallel, and thus an entire execution time of the job flow f1 is 40 minutes (=10+20+10).

On the other hand, a job flow f2 includes job#E and job#F. Job#E is a starting job and job#F is a final job. Assuming that predicted execution times of job#E and job#F are respectively 5 minutes and 10 minutes, an entire execution time of the job flow f2 is 15 minutes (=5+10).

Since it is predicted that the entire execution time of the job flow f1 is longer than that of the job flow f2, the job flow f1 becomes a critical path with respect to the job flows f1 and f2 (an integrated time in FIG. 7 will be described later).

In a case where a priority is set to a job, a priority of a job on a critical path is set to be higher than a priority of a job which is not present on a critical path. If such a priority is set, a job on a critical path may be preferentially executed even in a case where there is a restriction on a resource when a plurality of jobs are to be executed at a certain time.

In the above description, a job flow whose entire execution time is the longest among a plurality of job flows is set as a critical path, but in a case where a scheduled end time (deadline) is set for a job, a job flow whose scheduled end time is the earliest (deadline is the earliest) is treated as a critical path in an equivalent manner, and a priority is set.

Next, a description will be made of a flow of processes from setting of a critical path to setting of a priority to a job on the critical path.

(1) During job scheduling (for example, in a case of performing job scheduling every day for execution of jobs in one day), the critical path setting unit 14 acquires a predicted execution time of a job in a job flow from the job definition table T2.

If a scheduled end time (deadline) is not set for the jobs, the critical path setting unit 14 integrates a predicted execution time of each job up to a final job of the job flow, so as to calculate an entire execution time of the job flow.

(2) In integrating the predicted execution time, the critical path setting unit 14 uses the "Peak exec time" of the job definition table T2 in a case where the execution date of the job corresponds to the peak execution date. In a case where the execution date of the job is not the peak execution date, the "exec time" of the job definition table T2 is used.

(3) The critical path setting unit 14 obtains an integrated time through backward calculation from a final job of the job flow in an integration process of a predicted execution time for obtaining an entire execution time. Therefore, first, which one of the jobs is the final job is determined.

In the determination process of the final job, the final job may be found by searching for a job which is not set as a preceding job. In other words, in a case of a preceding job which is executed prior to another job, a preceding job number is appended thereto, and the preceding job number is not appended to the final job. Therefore, the critical path setting unit 14 determines a job which does not have the preceding job number as the final job.

(4) In the integration process, the critical path setting unit 14 adds a predicted execution time in a direction from the final job to a starting job. In the example of FIG. 7, as for the job flow f1, job#D is a final job, and a predicted execution time thereof is 10 minutes. Thus, an integrated time in job#D is 10 minutes.

In job#B and job#C which precede job#D, a greater predicted execution time of job#B and job#C is added. In this example, the predicted execution times of job#B and job#C are all 20 minutes, and the integrated time of job#D on the subsequent stage is 10 minutes. Therefore, an integrated time in job#B and job#C is 30 minutes (=20+10).

In job#A which precedes job#B and job#C, a predicted execution time of job#A is 10 minutes, and the integrated time up to job#B and job#C on the subsequent stage is 30 minutes. Therefore, an integrated time in job#A is 40 minutes (=10+30).

Similarly, as for the job flow f2, job#F is a final job, and a predicted execution time thereof is 10 minutes. Therefore, an integrated time in job#F is 10 minutes. A predicted execution time of job#E which precedes job#F is 5 minutes, and the integrated time of job#F on the subsequent stage is 10 minutes. Therefore, an integrated time in job#E is 15 minutes (=5+10).

(5) The critical path setting unit 14 sets a route which produces a maximal integrated time as a critical path as a result of the integration process. In addition, the priority setting unit 16 recognizes that a job on the critical path has no delayable grace time, and gives a higher priority to the job on the critical path (increases a priority to be selected for execution under the same execution condition).

If there is a job having a scheduled end time (deadline), the critical path setting unit 14 obtains a critical path for each job having a scheduled end time, and the priority setting unit 16 increases a priority of a job on the critical path.

Next, a description will be made of a process of job dispatch based on a priority. FIG. 8 is a diagram illustrating a configuration example of a priority setting table. The information management section 30 includes a priority setting table T4. The priority setting table T4 has items such as a job name, a scheduled start time, a scheduled end time, an integrated time, presence or absence on a critical path, and a priority.

The priority setting unit 16 dispatches a job based on a priority registered in this way. With respect to a start timing of job dispatch, the job dispatch is performed when a job is executed in a time slot in which there is a margin in a system resource (execution multiplicity) (when the job is executed for the first time), or when execution of a preceding job ends. In a case where a plurality of jobs may be executed, a job with a high priority is preferentially executed.

At a start time of a job, the priority setting unit 16 determines whether or not another job is executed in a time slot when the job is executed. In a case where another job is scheduled to be executed in the same time slot, and the number of jobs which are scheduled to be executed exceeds preset system multiplicity, postponement of job execution is determined.

Figure 9:
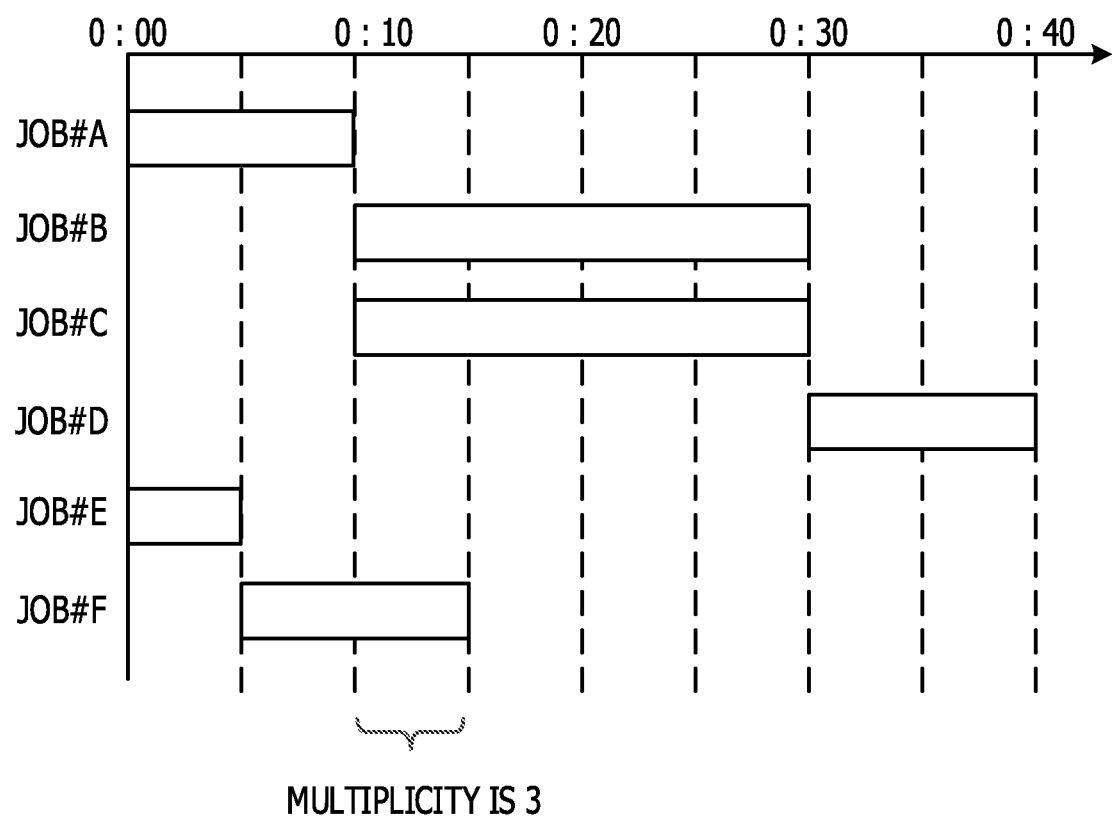
FIG. 9 is a diagram illustrating non-prioritized execution of a job.

FIG. 9 is a diagram illustrating non-prioritized execution of a job. The longitudinal axis expresses types of jobs, and the transverse axis expresses time. FIG. 9 illustrates a case where the job flows f1 and f2 illustrated in FIG. 7 are exemplified, and it is assumed that there is no restriction on the system multiplicity.

<0:00> Execution of job#A and job#E starts.
<0:05> The execution of job#A is in progress. The execution of job#E ends. Execution of job#F starts.
<0:10> The execution of job#A ends. Execution of job#B and job#C starts. The execution of job#F is in progress.
<0:15> The execution of job#B and job#C is in progress. The execution of job#F ends.
<0:20> The execution of job#B and job#C is in progress.
<0:25> The execution of job#B and job#C is in progress.
<0:30> The execution of job#B and job#C ends. Execution of job#D starts.
<0:35> The execution of job#D is in progress.
<0:40> The execution of job#D ends.

As above, the above-described scheduling is possible if the system multiplicity is allowed to be set to 3. However, in a case where there is a restriction that the system multiplicity is 2, the above-described scheduling is unable to be performed since three jobs are to be executed concurrently in the time slot of 0:10 to 0:15.

Figure 10:
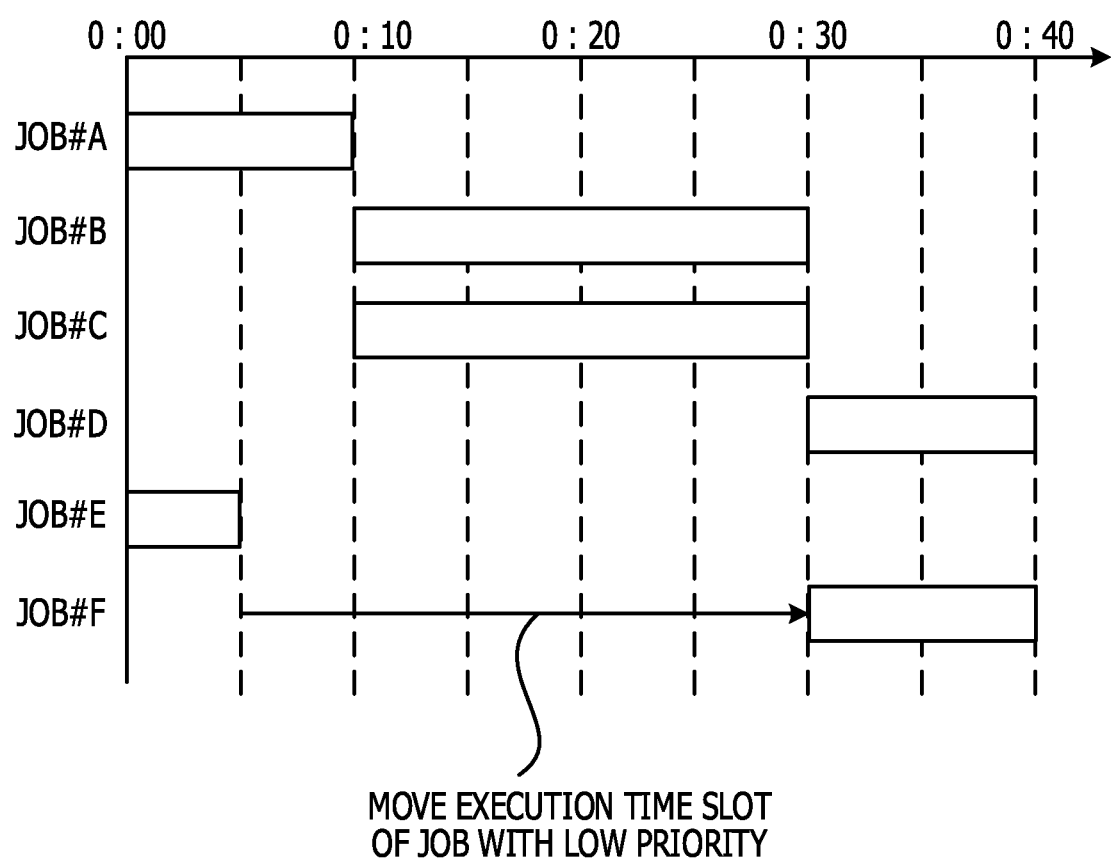
FIG. 10 is a diagram illustrating prioritized execution of a job.

FIG. 10 is a diagram illustrating prioritized execution of a job. The longitudinal axis expresses types of jobs, and the transverse axis expresses time. FIG. 10 illustrates a case where the job flows f1 and f2 illustrated in FIG. 7 are exemplified, and it is assumed that the system multiplicity is set to 2.

<0:00> Execution of job#A and job#E starts.
<0:05> The execution of job#A is in progress. The execution of job#E ends.
<0:10> The execution of job#A ends. Execution of job#B and job#C starts.
<0:15> The execution of job#B and job#C is in progress.
<0:20> The execution of job#B and job#C is in progress.
<0:25> The execution of job#B and job#C is in progress.
<0:30> The execution of job#B and job#C ends. Execution of job#D and job#F starts.
<0:35> The execution of job#D and job#F is in progress.
<0:40> The execution of job#D and job#F ends.

At the time point 0:05 when the execution of job#E ends, the job whose execution is in progress at the time point 0:05 is only job#A (multiplicity of currently executed jobs is 1), and thus execution of the subsequent job#F may be considered as illustrated in FIG. 9. However, since a predicted execution time slot of job#F is 0:05 to 0:15, job#B and job#C may possibly be executed in this time slot, and thus the maximal multiplicity becomes 3 in this case.

Here, remaining predicted execution time of job#A is 5 minutes from 0:05 to 0:10, and the integrated predicted execution time of job#A is 40 minutes as illustrated in FIG. 7. Therefore, first, the priority setting unit 16 subtracts the remaining predicted execution time of 5 minutes from the integrated predicted execution time 40 minutes of job#A so as to calculate the remaining integrated predicted execution time of 35 minutes of job#A.

An integrated predicted execution time of job#F is 10 minutes. Through comparison with the remaining integrated predicted execution time of job#A on the critical path, the priority setting unit 16 determines that the grace time is 35 minutes, and thus there is grace for 25 minutes which is obtained by subtracting the integrated predicted execution time of 10 minutes of job#F from the grace time of 35 minutes.

The priority setting unit 16 obtains, in a range of the grace time of job#F, a time slot which does not exceed the system multiplicity. In this case, the priority setting unit 16 determines that the system multiplicity excluding job#F is simplex (there is a margin of simplex) at the time point 0:30 (25 minutes later), and recognizes that execution start of job#F may be postponed up to 25 minutes later.

Accordingly, the job scheduling is performed in an available resource of the system by not only increasing a priority but also positively postponing a job with a low priority, and thus it is possible to avoid delay of job execution.

Here, for example, the job scheduler 10 obtains a critical path of jobs in which a target end time is set when an operation for a day starts, and increases a priority of a job on the critical path and executes the job without changing a start time of the job.

On the other hand, the job scheduler 10 positively decreases, in a range of a grace time and a predicted execution time, a priority of a job which is not present on the critical path and which is to be executed in a time slot when a resource is not sufficient, and postpones an execution time of the job. Accordingly, it is possible to avoid delay of job execution of the entire system without influencing a job with a high priority.

Next, a process of evaluating a critical path will be described. The critical path evaluation is performed if either one of the following conditions (condition #1 and condition #2) is satisfied.

Condition #1: In a case where, a job is present on a critical path when execution of the job starts, and a practical execution time of the job is shorter than a predicted execution time (the predicted execution time>the practical execution time).

Condition #2: In a case where, a job is not present on a critical path when execution of the job starts, and a practical execution time of the job is longer than a predicted execution time (the predicted execution time<the practical execution time).

The condition #1 indicates a possibility that a job which has not been present on a critical path becomes a job on a new critical path since a practical execution time of a job on a critical path is shorter than a predicted execution time.

The condition #2 indicates a possibility that a job which has not been present on the critical path becomes a job on a new critical path since a practical execution time of a job which has not been present on a critical path is longer than a predicted execution time.

Figure 11:
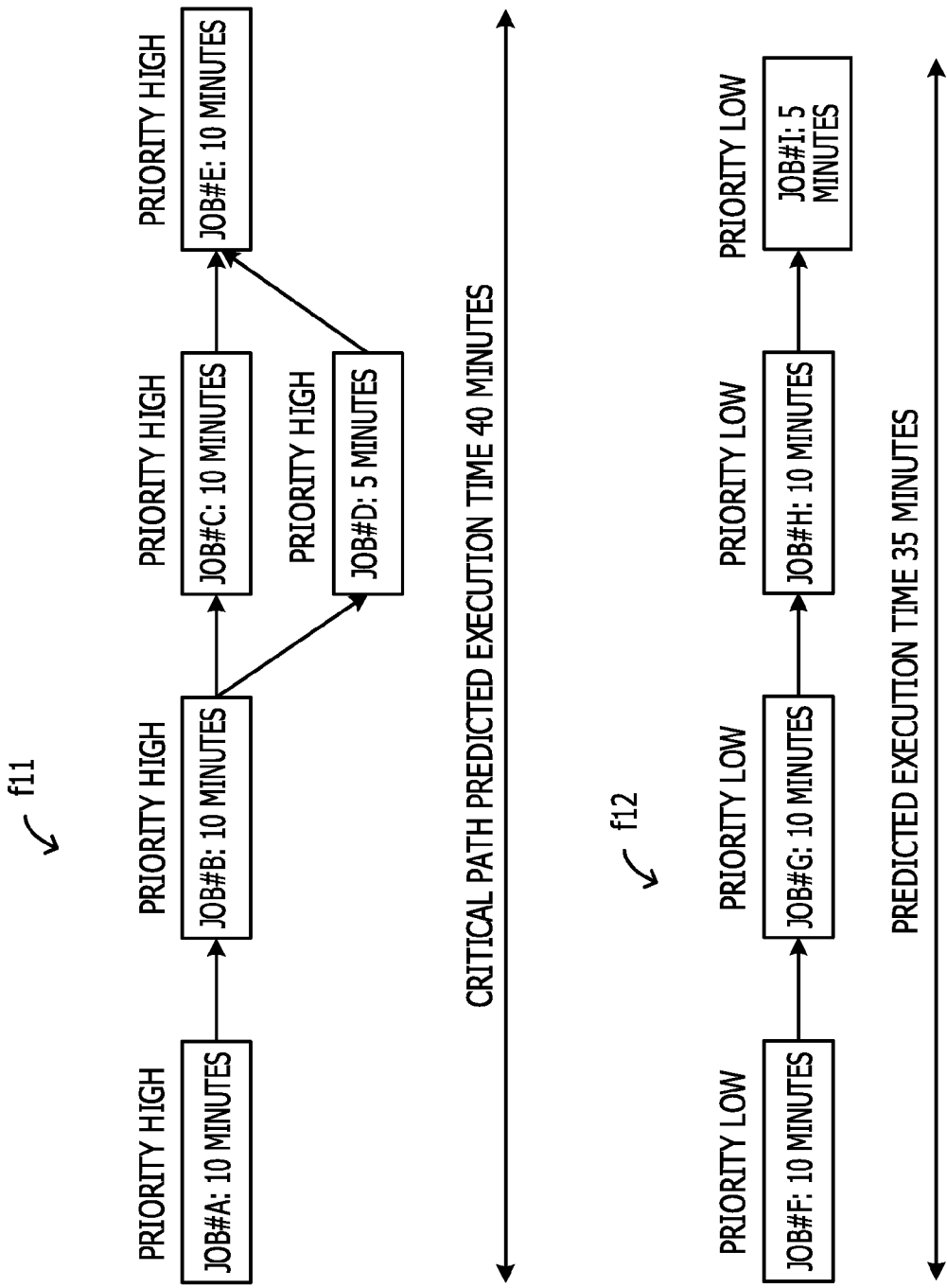
FIG. 11 is a diagram illustrating a job flow of a critical path and a job flow of a path which is not a critical path.

Next, the process of evaluating a critical path will be described by using a specific example. FIG. 11 is a diagram illustrating a job flow of a critical path and a job flow of a path which is not a critical path.

A job flow f11 includes job#A, job#B, job#C, job#D, and job#E. Job#A is a starting job, and job#E is a final job, and an execution order is indicated by the arrows in FIG. 11. The intervening Job#C and job#D are jobs executed concurrently in duplex.

Predicted execution times of job#A, job#B, job#C, and job#E are all 10 minutes, and a predicted execution time of job#D is 5 minutes. Therefore, an entire predicted execution time of the job flow f11 is 40 minutes (=10+10+10+10).

A job flow f12 includes job#F, job#G, job#H, and job#I. Job#F is a starting job, and job#I is a final job, and an execution order is indicated by the arrows in FIG. 11. Predicted execution times of job#F, job#G, and job#H are all 10 minutes, and a predicted execution time of job#I is 5 minutes. Therefore, an entire predicted execution time of the job flow f12 is 35 minutes (=10+10+10+5).

As for the job flows f11 and f12, the entire predicted execution time of the job flow f11 is longer than that of the job flow f12, and thus the job flow f11 becomes a critical path regarding the two job flows. Therefore, execution priorities of job#A, job#B, job#C, job#D, and job#E on the critical path are set to be higher than execution priorities of job#F, job#G, job#H, and job#I which are not present on the critical path.

Figure 12:
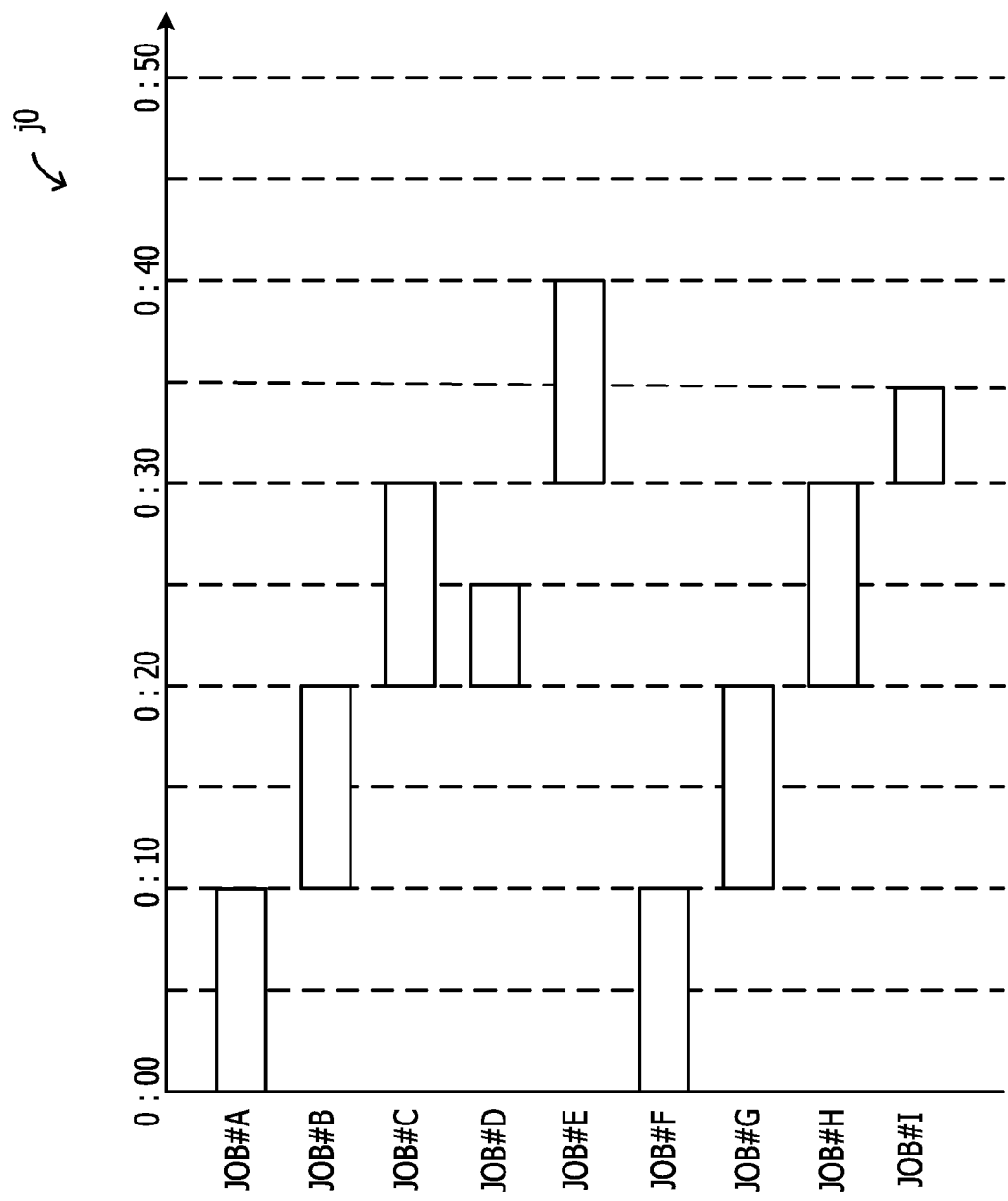
FIG. 12 is a diagram illustrating job scheduling.

FIG. 12 is a diagram illustrating job scheduling. The longitudinal axis expresses types of jobs, and the transverse axis expresses time. FIG. 12 illustrates job scheduling j0 of the job flows f11 and f12.

<0:00> Execution of job#A and job#F starts.

<0:05> The execution of job#A and job#F is in progress.

<0:10> The execution of job#A and job#F ends. Execution of job#B and job#G starts.

<0:15> The execution of job#B and job#G is in progress.

<0:20> The execution of job#B and job#G ends. Execution of job#C, job#D, and job#H starts.

<0:25> The execution of job#C and job#H is in progress. The execution of job#D ends.

<0:30> The execution of job#C and job#H ends. Execution of job#E and job#I starts.

<0:35> The execution of job#E is in progress. The execution of job#H ends.

<0:40> The execution of job#E ends.

In the job scheduling j0, it is assumed that there is no restriction on the system multiplicity, and a predicted execution time is the same as a practical execution time. For this reason, in a case where execution of both of the job flows f11 and f12 are started at the time point 0:00, the execution of the job flow f11 ends exactly at the time point 0:40 since the entire predicted execution time of the job flow f11 is 40 minutes. The execution of the job flow f12 ends exactly at the time point 0:35 since entire predicted execution time of the job flow f12 is 35 minutes.

Next, a description will be made of critical path evaluation in the case of condition #1. The description relates to an example in which a practical execution time of a job on a critical path is shorter than a predicted execution time (the predicted execution time>the practical execution time), and a critical path is evaluated when execution of the job ends.

Figure 13:
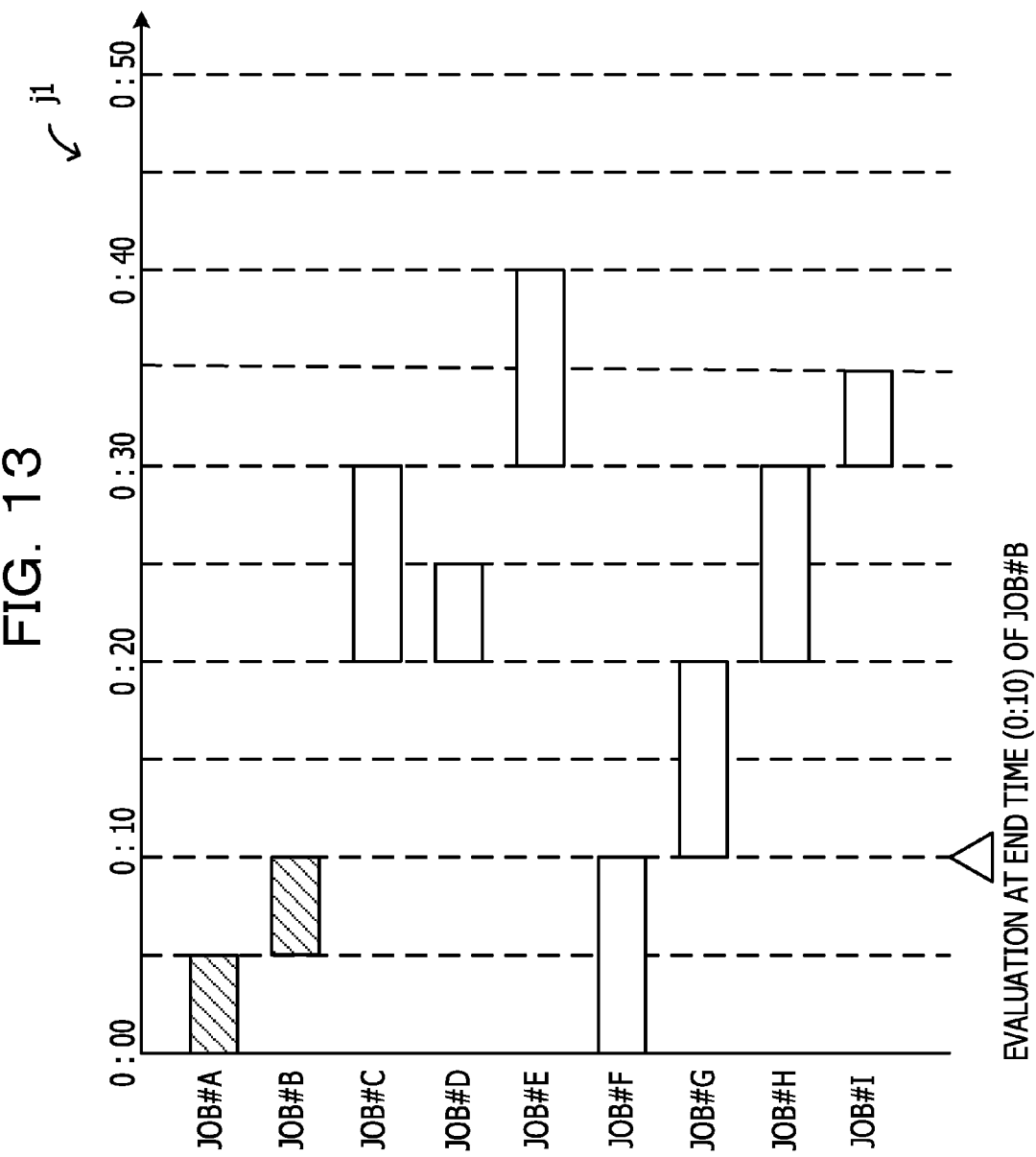
FIG. 13 is a diagram illustrating job scheduling.

FIG. 13 is a diagram illustrating job scheduling. The longitudinal axis expresses types of jobs, and the transverse axis expresses time. FIG. 13 illustrates job scheduling j1 in a case where the practical execution times of job#A and job#B on the critical path are 5 minutes shorter than the predicted execution times thereof as in the state of FIG. 12.

<0:00> Execution of job#A and job#F starts.

<0:05> The execution of job#A ends. Execution of job#B starts. The execution of job#F is in progress.

<0:10> The execution of job#B and job#F ends. Execution of job#G starts.

<0:15> The execution of job#G is in progress.

<0:20> Execution of job#C, job#D, and job#H starts. The execution of job#G ends.

<0:25> The execution of job#C and job#H is in progress. The execution of job#D ends.

<0:30> The execution of job#C and job#H ends. Execution of job#E and job#I starts.

<0:35> The execution of job#E is in progress. The execution of job#I ends.

<0:40> The execution of job#E ends.

In the above-described job scheduling j1, since the practical execution times of job#A and job#B are shorter than the predicted execution times thereof, critical path evaluation is performed at the time point 0:10 when the execution of job#B ends.

Prior to description of the critical path evaluation at the time point 0:10 when the execution of job#B ends, a description will be made of job scheduling in a case where critical path evaluation is not performed.

Figure 14:
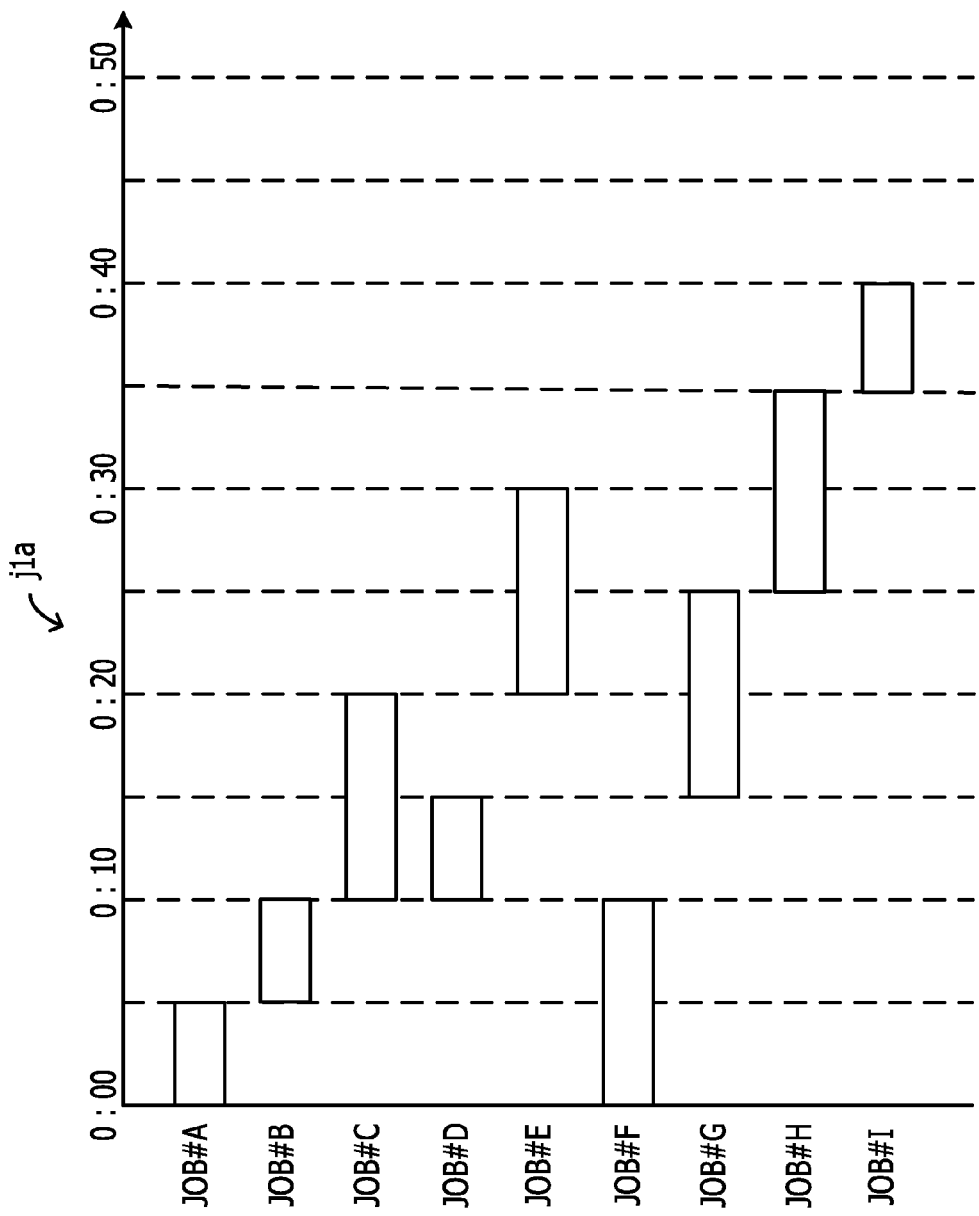
FIG. 14 is a diagram illustrating job scheduling.

FIG. 14 is a diagram illustrating job scheduling. The longitudinal axis expresses types of jobs, and the transverse axis expresses time. At the end time (0:10) of job#B, candidates of jobs to be executed next may include job#C, job#D, and job#G. FIG. 14 illustrates job scheduling j1a in a case where job#C and job#D which have been prioritized in the original critical path are executed without change, among the candidates including job#C, job#D, and job#G.

<0:00> Execution of job#A and job#F starts.
<0:05> The execution of job#A ends. Execution of job#B starts. The execution of job#F is in progress.
<0:10> The execution of job#B and job#F ends. Execution of job#C and job#D starts.
<0:15> The execution of job#C is in progress. The execution of job#D ends. Execution of job#G starts.
<0:20> The execution of job#C ends. Execution of job#E starts. The execution of job#G is in progress.
<0:25> The execution of job#E is in progress. The execution of job#G ends. Execution of job#H starts.
<0:30> The execution of job#E ends. The execution of job#H is in progress.
<0:35> The execution of job#H ends. Execution of job#I starts.
<0:40> The execution of job#I ends.

Here, starting of job#G is delayed since job#C and job#D with the high priorities on the original critical path are executed at the end time (0:10) of job#B, among the candidates including job#C, job#D, and job#G to be executed next.

The execution start time of job#G is 0:10 in the job scheduling j1, but the execution start time of job#G is 0:15 in the job scheduling j1a.

Then, execution start times and the execution end times of job#H and job#I which are subsequent to job#G are also delayed. That is, the execution start time and the execution end time of job#H in the job scheduling j1 are 0:20 and 0:30, respectively, but the execution start time and the execution end time of job#H in the job scheduling j1a are 0:25 and 0:35, respectively.

The execution start time and the execution end time of job#I in the job scheduling j1 are 0:30 and 0:35, respectively, but the execution start time and the execution end time of job#I in the job scheduling j1a are 0:35 and 0:40, respectively.

Next, a description will be made of job scheduling in which critical path evaluation is performed at the job execution end time (0:10) of job#B. Looking at the job scheduling j1a of FIG. 14, it may be seen that, at the end time (0:10) of job#B, the most delayed path, which is a critical path, shifts to the route of job#G, job#H, and job#I, in practice.

Therefore, in order to avoid delay of job#G, job#H, and job#I, a schedule after the end time of job#B is evaluated based on the predicted execution times of job#G, job#H, and job#I at the end time of job#B.

Figure 15:
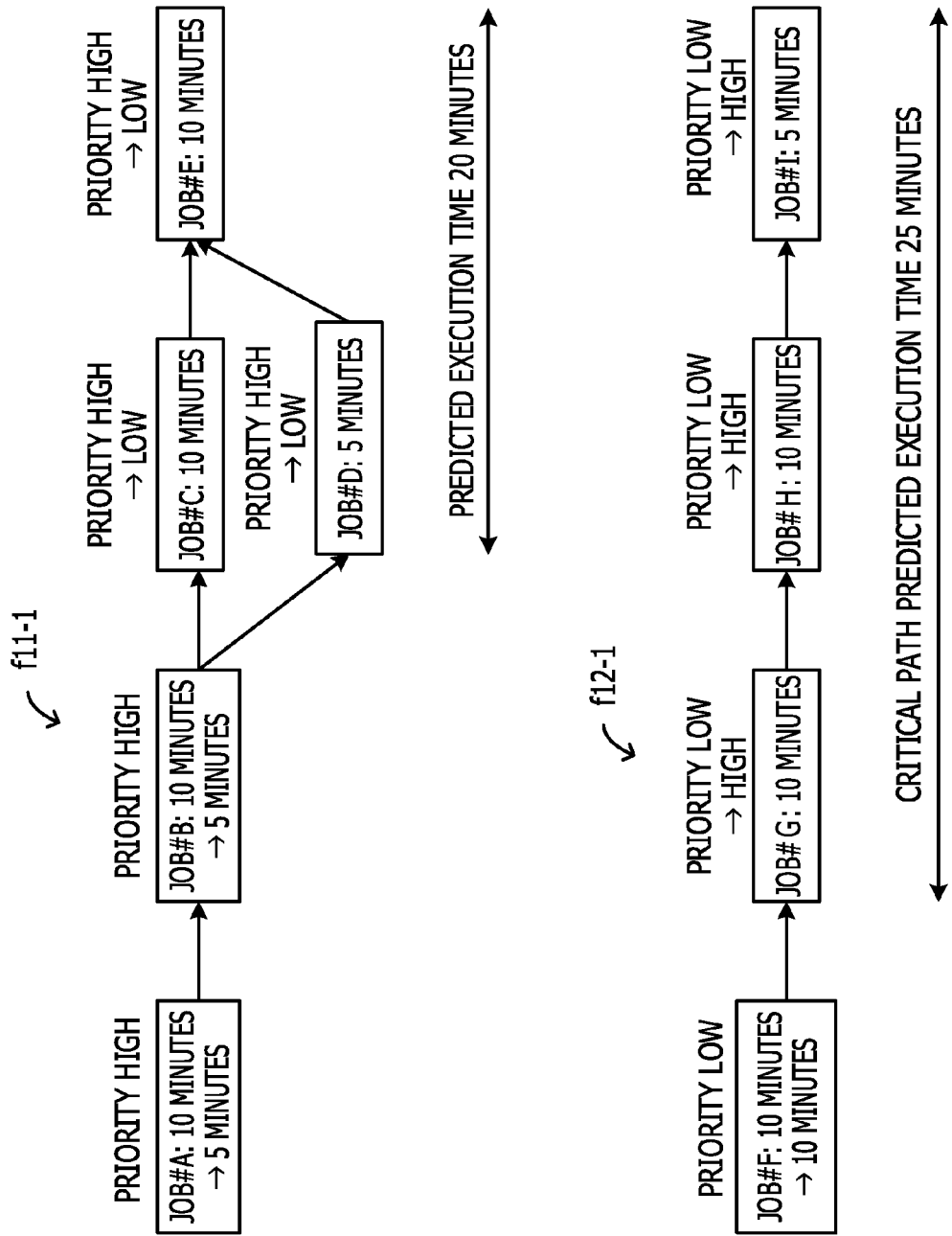
FIG. 15 is a diagram illustrating a new critical path after being evaluated.

FIG. 15 is a diagram illustrating a new critical path after being evaluated. In a job flow f11-1, in relation to predicted execution times of job#A, job#B, job#C, job#D, and job#E, originally, the predicted execution times of job#A, job#B, job#C, and job#E are 10 minutes, and the predicted execution time of job#D is 5 minutes, but practical execution times of job#A and job#B are 5 minutes. Therefore, in integration of predicted execution times of the other jobs at the end time (0:10) of job#B, an integrated value for job#C, job#D, and job#E is 20 minutes (=10+10).

In a job flow f12-1, in integration of predicted execution times of the other jobs at the end time (0:10) of job#B, an integrated value for job#G, job#H, and job#I is 25 minutes (=10+10+5).

By performing the comparison of the predicted execution times of the other jobs, an execution time of the flow of job#G, job#H, and job#I may be recognized to be longer than that of the flow of job#C, job#D, and job#E. Therefore, the jobs such as job#G, job#H, and job#I are set to jobs on a new critical path, and priorities of job#G, job#H, and job#I are set to be higher than those of job#C, job#D, and job#E.

By performing such critical path evaluation and resetting of a critical path, it is possible to minimize the occurrence of delay of job execution which influences a schedule of the entire system.

Figure 16:
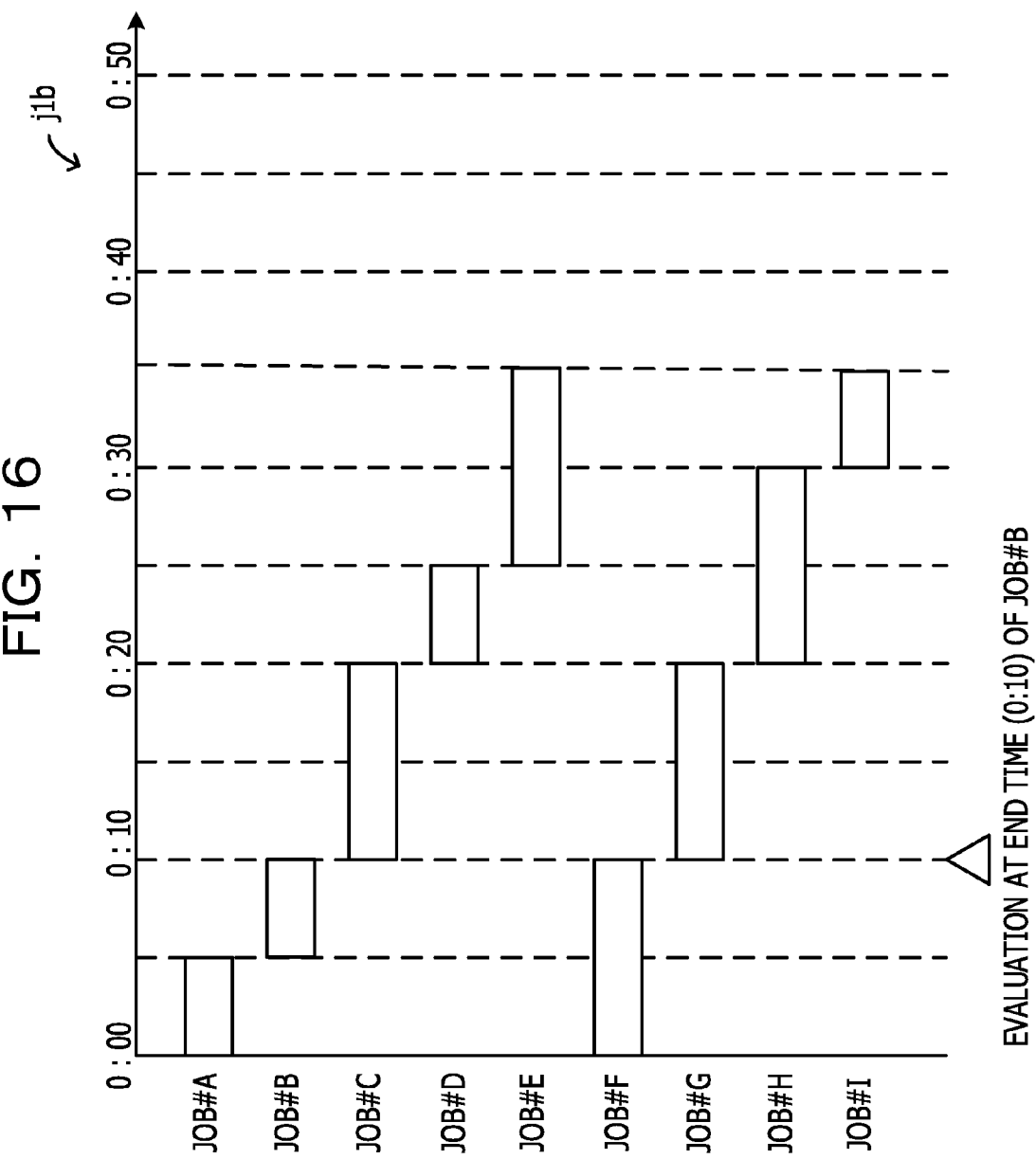
FIG. 16 is a diagram illustrating job scheduling.

FIG. 16 is a diagram illustrating job scheduling. The longitudinal axis expresses types of jobs, and the transverse axis expresses time. FIG. 16 illustrates job scheduling j1b in a case where the critical path evaluation is performed at the end time (0:10) of job#B.

<0:00> Execution of job#A and job#F starts.
<0:05> The execution of job#A ends. Execution of job#B starts. The execution of job#F is in progress.
<0:10> The execution of job#B and job#F ends. Execution of job#C and job#G starts.
<0:15> The execution of job#C and job#G is in progress.
<0:20> The execution of job#C and job#G ends. Execution of job#D and job#H starts.
<0:25> The execution of job#D ends. Execution of job#E starts. The execution of job#H is in progress.
<0:30> The execution of job#E is in progress. The execution of job#H ends. The execution of job#I starts.
<0:35> The execution of job#E ends. The execution of job#I ends.

As in the above-described job scheduling j1b, at the end time of job#B, a critical path is optimized by evaluating the critical path, and job#G is executed. Therefore, it is possible to minimize delay of execution start times and execution end times of job#G, job#H, and job#I.

Next, a description will be made of critical path evaluation in the case of condition #2. The description relates to an example in which a practical execution time of a job which is not present on a critical path when execution of the job starts is longer than a predicted execution time (the predicted execution time<the practical execution time), and a critical path is evaluated when execution of the job ends.

Figure 17:
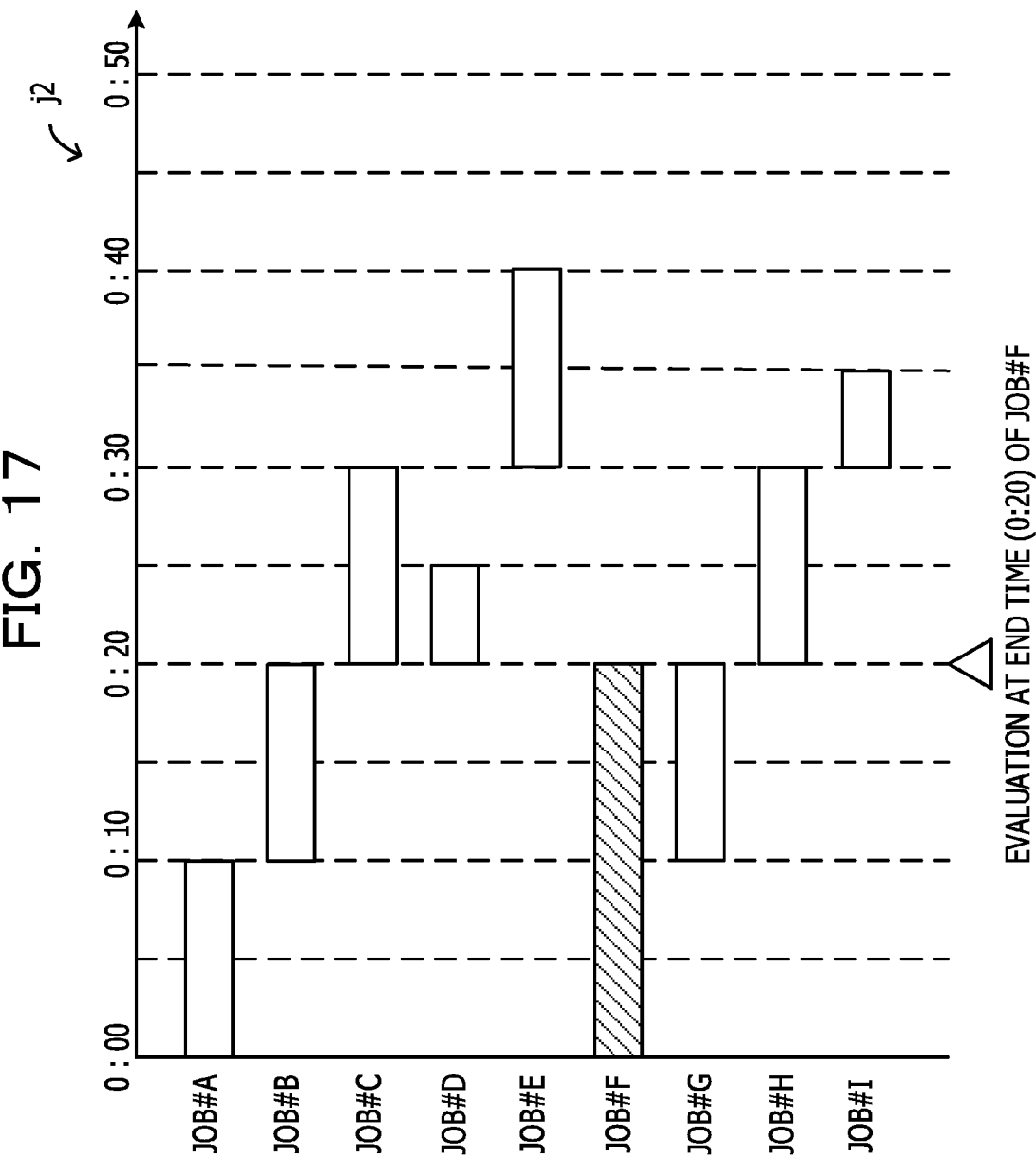
FIG. 17 is a diagram illustrating job scheduling.

FIG. 17 is a diagram illustrating job scheduling. The longitudinal axis expresses types of jobs, and the transverse axis expresses time. FIG. 17 illustrates job scheduling j2 in a case where an execution time of job#F which is not present on the original critical path is longer (10 minutes longer) than a predicted execution time thereof as in the state of FIG. 12.

<0:00> Execution of job#A and job#F starts.
<0:05> The execution of job#A and job#F is in progress.
<0:10> The execution of job#A ends. Execution of job#B and job#G starts. The execution of job#F is in progress.
<0:15> The execution of job#B, job#F, and job#G is in progress.
<0:20> The execution of job#B, job#F, and job#G ends. Execution of job#C, job#D, and job#H starts.
<0:25> The execution of job#C and job#H is in progress. The execution of job#D ends.
<0:30> The execution of job#C and job#H ends. The execution of job#E and job#I starts.
<0:35> The execution of job#E is in progress. The execution of job#I ends.
<0:40> The execution of job#E ends.

In the job scheduling j2, since the execution time of job#F which is not present on the original critical path is longer than the predicted execution time, critical path evaluation is performed at the execution end time (0:20) of job#F.

Prior to description of the critical path evaluation at the time point 0:20 when the execution of job#F ends, a description will be made of job scheduling in a case where critical path evaluation is not performed.

Figure 18:
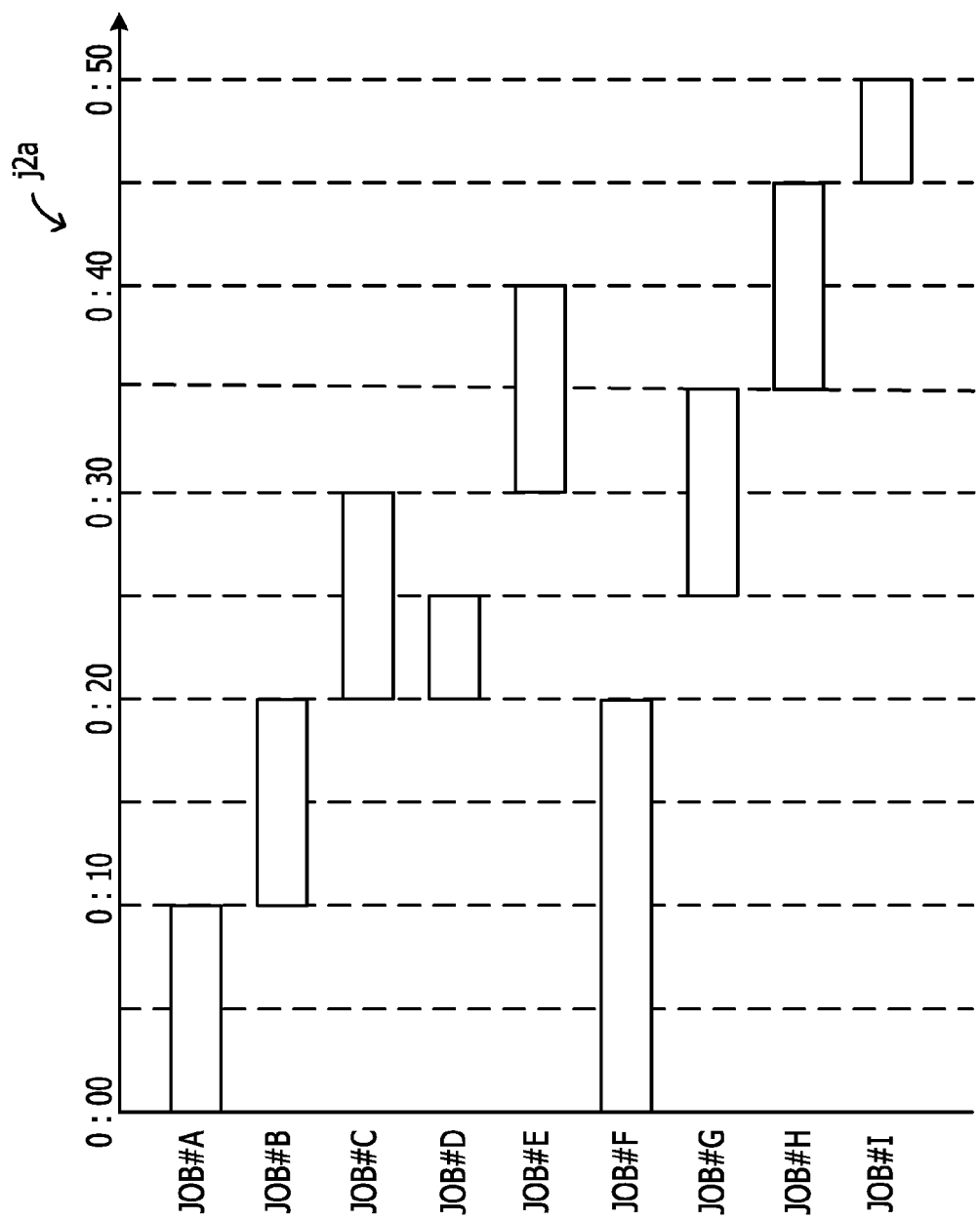
FIG. 18 is a diagram illustrating job scheduling.

FIG. 18 is a diagram illustrating job scheduling. The longitudinal axis expresses types of jobs, and the transverse axis expresses time. At the end time (0:20) of job#F, candidates of jobs to be executed next may include job#C, job#D, and job#G. FIG. 18 illustrates job scheduling j2a in a case where job#C and job#D which have been prioritized in the original critical paths are executed without change, among the candidates including job#C, job#D, and job#G.

<0:00> Execution of job#A and job#F starts.
<0:05> The execution of job#A and job#F is in progress.
<0:10> The execution of job#A ends. Execution of job#B starts. The execution of job#F is in progress.
<0:15> The execution of job#B and job#F is in progress.
<0:20> The execution of job#B and job#F ends. Execution of job#C and job#D starts.
<0:25> The execution of job#C is in progress. The execution of job#D ends. Execution of job#G starts.
<0:30> The execution of job#C ends. Execution of job#E starts. The execution of job#G is in progress.
<0:35> The execution of job#E is in progress. The execution of job#G ends. Execution of job#H starts.
<0:40> The execution of job#E ends. The execution of job#H is in progress.
<0:45> The execution of job#H ends. Execution of job#I starts.
<0:50> The execution of job#I ends.

Here, starting of job#G is delayed since job#C and job#D with the high priorities on the original critical path are executed at the end time (0:20) of job#F, among the candidates including job#C, job#D, and job#G to be executed next.

The execution start time of job#G is 0:10 in the job scheduling j2, but the execution start time of job#G is 0:25 in the job scheduling j2a.

Then, execution start times and the execution end times of job#H and job#I which are subsequent to job#G are also delayed. That is, the execution start time and the execution end time of job#H in the job scheduling j2 are 0:20 and 0:30, respectively, but the execution start time and the execution end time of job#H in the job scheduling j2a are 0:35 and 0:45, respectively.

The execution start time and the execution end time of job#I in the job scheduling j2 are 0:30 and 0:35, respectively, but the execution start time and the execution end time of job#I in the job scheduling j2a are 0:45 and 0:50, respectively.

Next, a description will be made of job scheduling in which critical path evaluation is performed at the job execution end time (0:20) of job#F. Looking at the job scheduling j2a, it may be seen that, at the end time of job#F, the most delayed path, which is a critical path, shifts to the route of job#G, job#H, and job#I, in practice.

Therefore, in order to avoid delay of job#G, job#H, and job#I, a schedule after the end time of job#F is evaluated based on the predicted execution times of job#G, job#H, and job#I at the end time of job#F.

Figure 19:
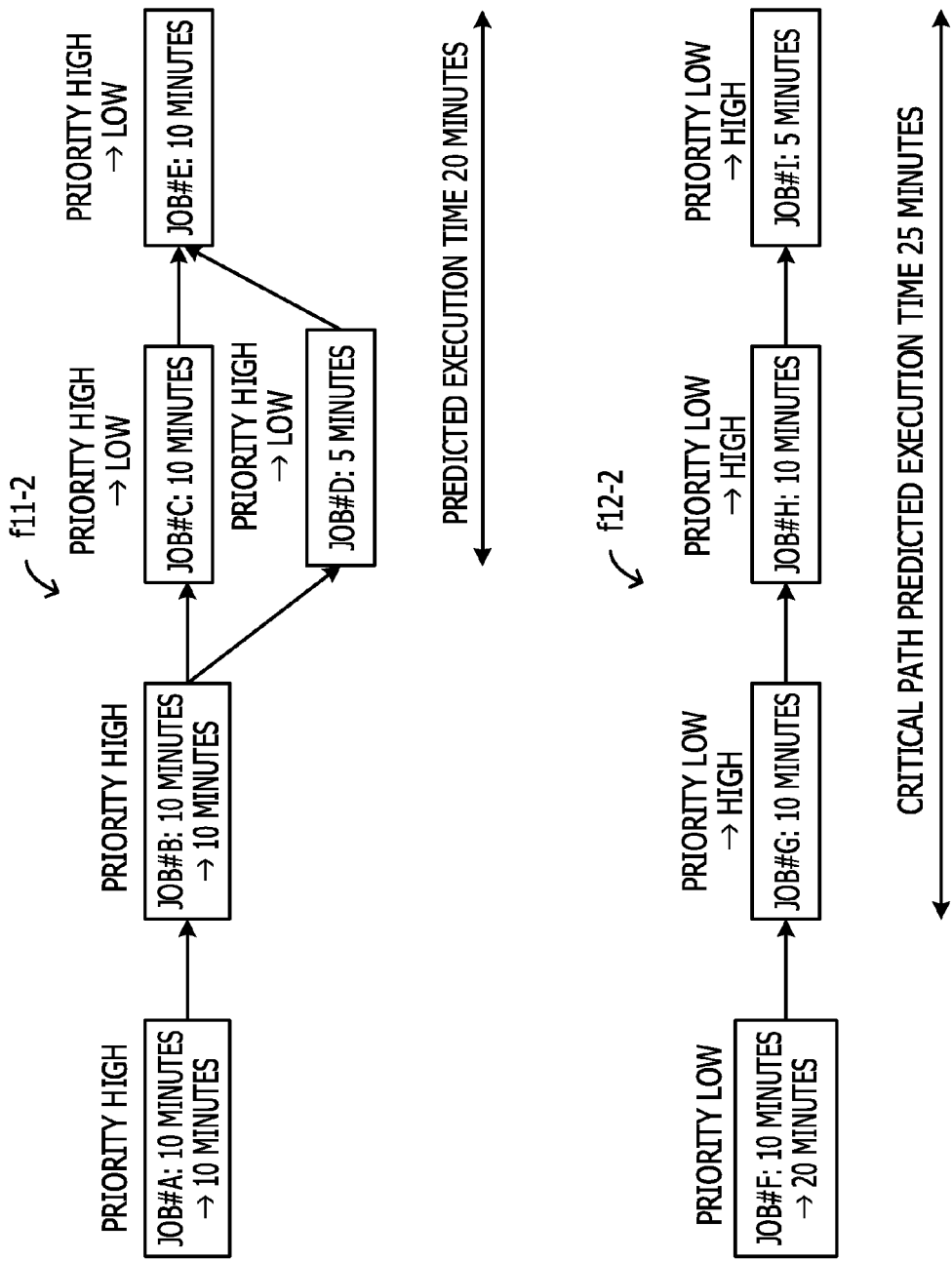
FIG. 19 is a diagram illustrating a new critical path after being evaluated.

FIG. 19 is a diagram illustrating a new critical path after being evaluated. In a job flow f11-2, in integration of predicted execution times of the other jobs at the end time (0:20) of job#F, an integrated value for job#C, job#D, and job#E is 20 minutes (=10+10).

In a job flow f12-2, the predicted execution time of job#F is originally 10 minutes, and, in practice, the execution time thereof is 20 minutes. Therefore, in integration of predicted execution times of the other jobs at the end time (0:20) of job#F, an integrated value for job#G, job#H, and job#I is 25 minutes (=10+10+5).

By performing the comparison of the predicted execution times of the other jobs, an execution time of the flow of job#G, job#H, and job#I may be recognized to be longer than that of the flow of job#C, job#D, and job#E. Therefore, the jobs such as job#G, job#H, and job#I are set to jobs on a new critical path, and priorities of job#G, job#H, and job#I are set to be higher than those of job#C, job#D, and job#E. By performing such critical path evaluation and resetting of a critical path, it is possible to minimize the occurrence of delay of job execution which influences a schedule of the entire system.

Figure 20:
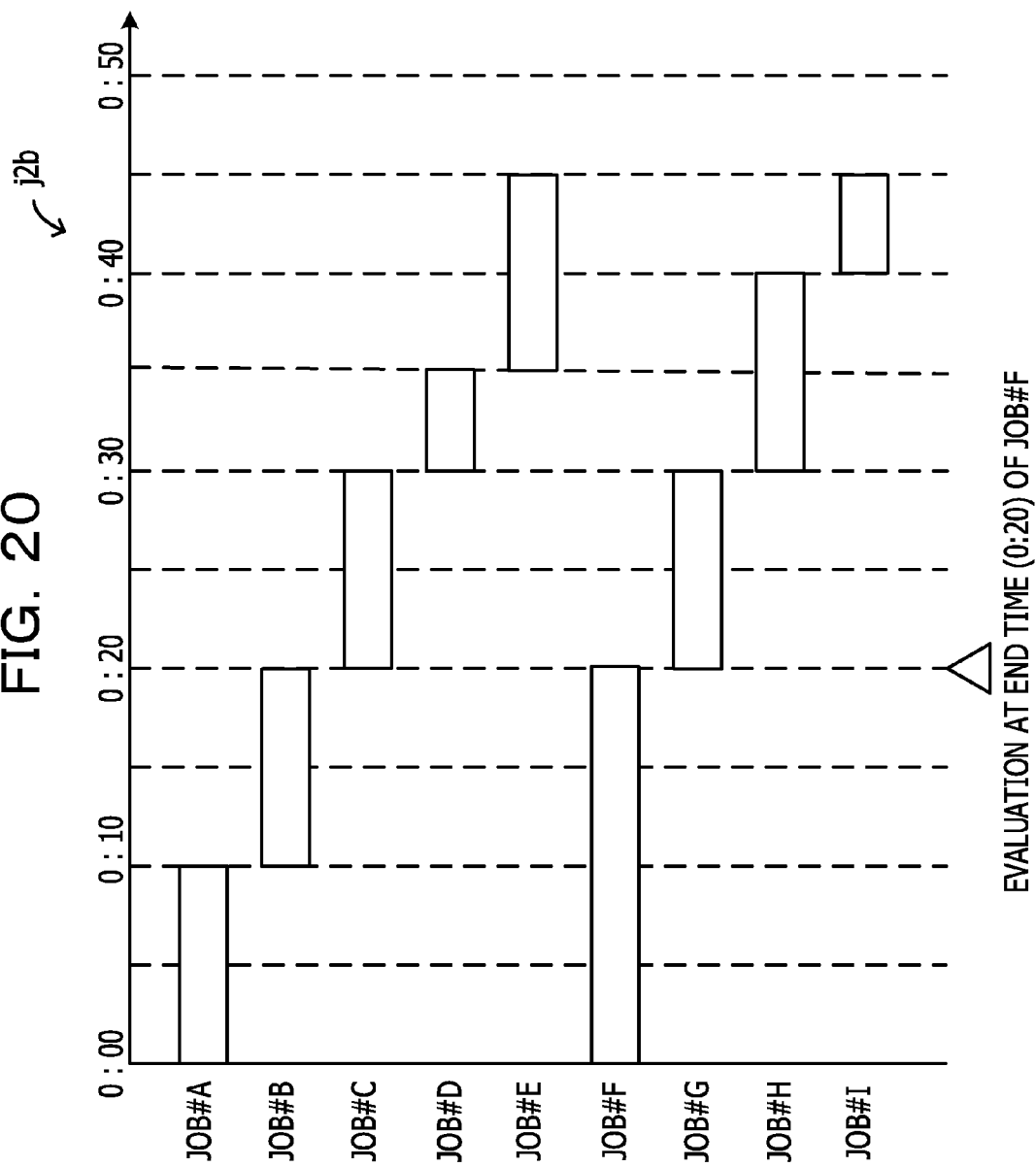
FIG. 20 is a diagram illustrating job scheduling.

FIG. 20 is a diagram illustrating job scheduling. The longitudinal axis expresses types of jobs, and the transverse axis expresses time. FIG. 20 illustrates job scheduling j2b in a case where the critical path evaluation is performed at the end time (0:20) of job#F.

<0:00> Execution of job#A and job#F starts.
<0:05> Execution of job#A and job#F is in progress.
<0:10> The execution of job#A ends. Execution of job#B starts. The execution of job#F is in progress.
<0:15> The execution of job#B and job#F is in progress.
<0:20> The execution of job#B and job#F ends. Execution of job#C and job#G starts.
<0:25> The execution of job#C and job#G is in progress.
<0:30> The execution of job#C and job#G ends. Execution of job#D and job#H starts.
<0:35> The execution of job#D ends. Execution of job#E starts. The execution of job#H is in progress.
<0:40> The execution of job#E is in progress. The execution of job#H ends. The execution of job#I starts.
<0:45> The execution of job#E and job#I ends.

As in the above-described job scheduling j2b, at the end time of job#F, a critical path is optimized by evaluating the critical path, and job#G is executed. Therefore, it is possible to minimize delay of execution start times and execution end times of job#G, job#H, and job#I.

Figure 21:
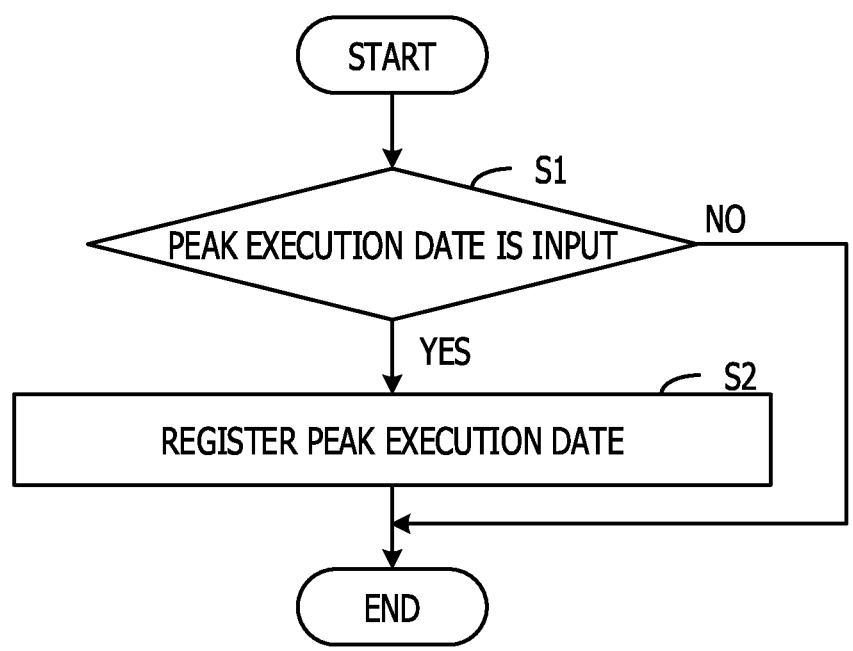
FIG. 21 is a flowchart illustrating an operation of a peak execution date registration unit.

Next, with reference to flowcharts, a description will be made of an operation of each constituent element of the job management server 2. FIG. 21 is a flowchart illustrating an operation of the peak execution date registration unit.

(S1) The peak execution date registration unit 13 determines whether or not the peak execution date is input via user interface section 40. In other words, it is determined whether or not the date is selected as the peak execution date from among the normal execution dates of a job. If the peak execution date is input, the flow proceeds to S2, and if the peak execution date is not input, the process ends.

(S2) The peak execution date registration unit 13 registers the peak execution date in a table of the information management section 30.

Figure 22:
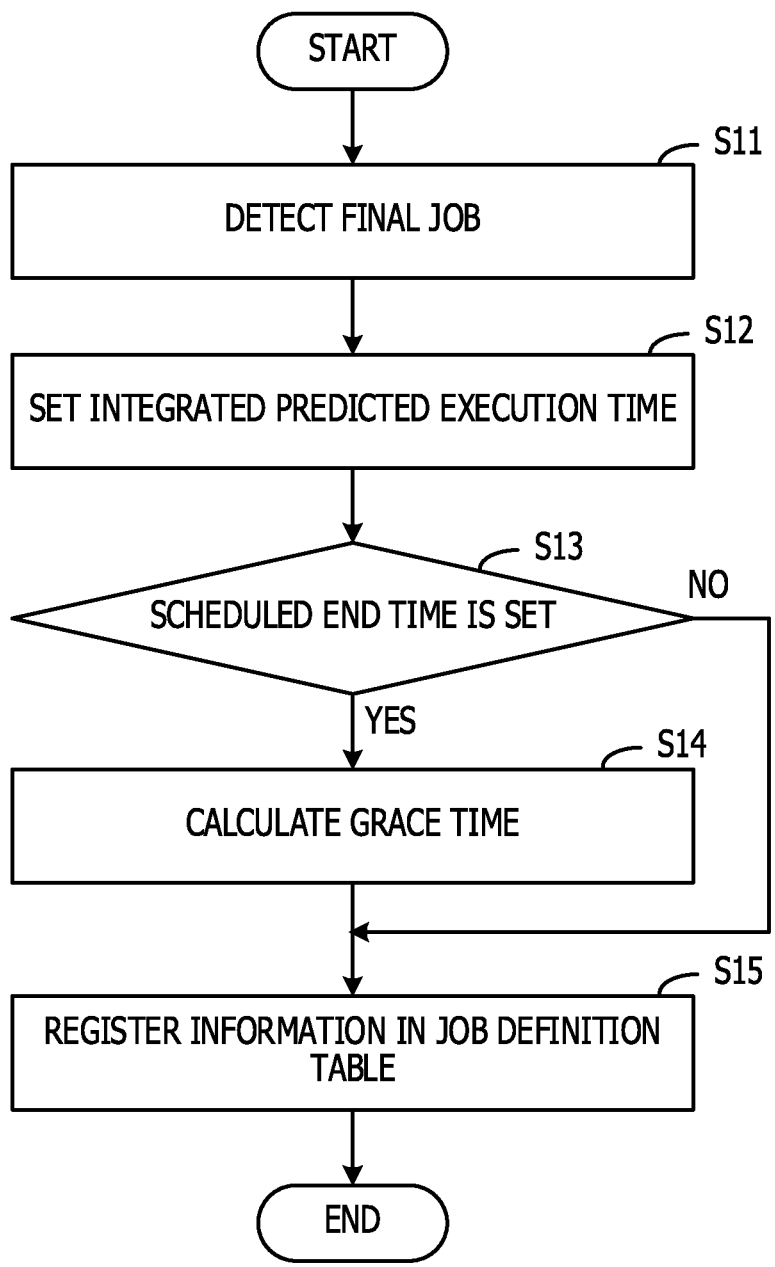
FIG. 22 is a flowchart illustrating an operation of a critical path setting unit.

FIG. 22 is a flowchart illustrating an operation of the critical path setting unit.

(S11) The critical path setting unit 14 refers to the job flow definition table T1, and detects final jobs in all job flows within a predetermined time period. The final job is a job which is not set as a preceding job of another job.

(S12) The critical path setting unit 14 tracks the job flow backward from the detected final job so as to set an integrated predicted execution time for each job.

(S13) The critical path setting unit 14 determines whether or not a scheduled end time (deadline) is set for the job flow. If the scheduled end time is set, the flow proceeds to S14, and if the scheduled end time is not set, the flow proceeds to S15.

(S14) In relation to each job which is not present on a critical path, the critical path setting unit 14 calculates a delayable grace time indicating to what extent job execution may be delayed until the job execution ends at the scheduled end time.

For example, it is assumed that there is a job flow which will end an hour later from the current time, and there is job#A which may end in any time slot within an hour. In addition, it is assumed that a job execution time of job#A is 10 minutes. In this case, if job#A starts to be executed 50 minutes later from the current time, an execution process of job#A is completed within an hour, and thus a grace time of job#A from the current time is 50 minutes.

(S15) The critical path setting unit 14 registers "ON (presence)" in the "criticalpath flg" of the job definition table T2, and a job name of a corresponding job in "microJES id". The critical path setting unit 14 also registers the "exec time".

In this time, it is determined whether or not the execution date is the peak execution date. If the execution date is the peak execution date, a value of the "Peak exec time" is set as the "exec time". If the execution date is not the peak execution date, a value of the "Prev exec time" is set as the "exec time".

The above-described operation flow is repeatedly performed on jobs having a scheduled end time among all jobs which are scheduled to be executed within a predetermined time period.

Figure 23:
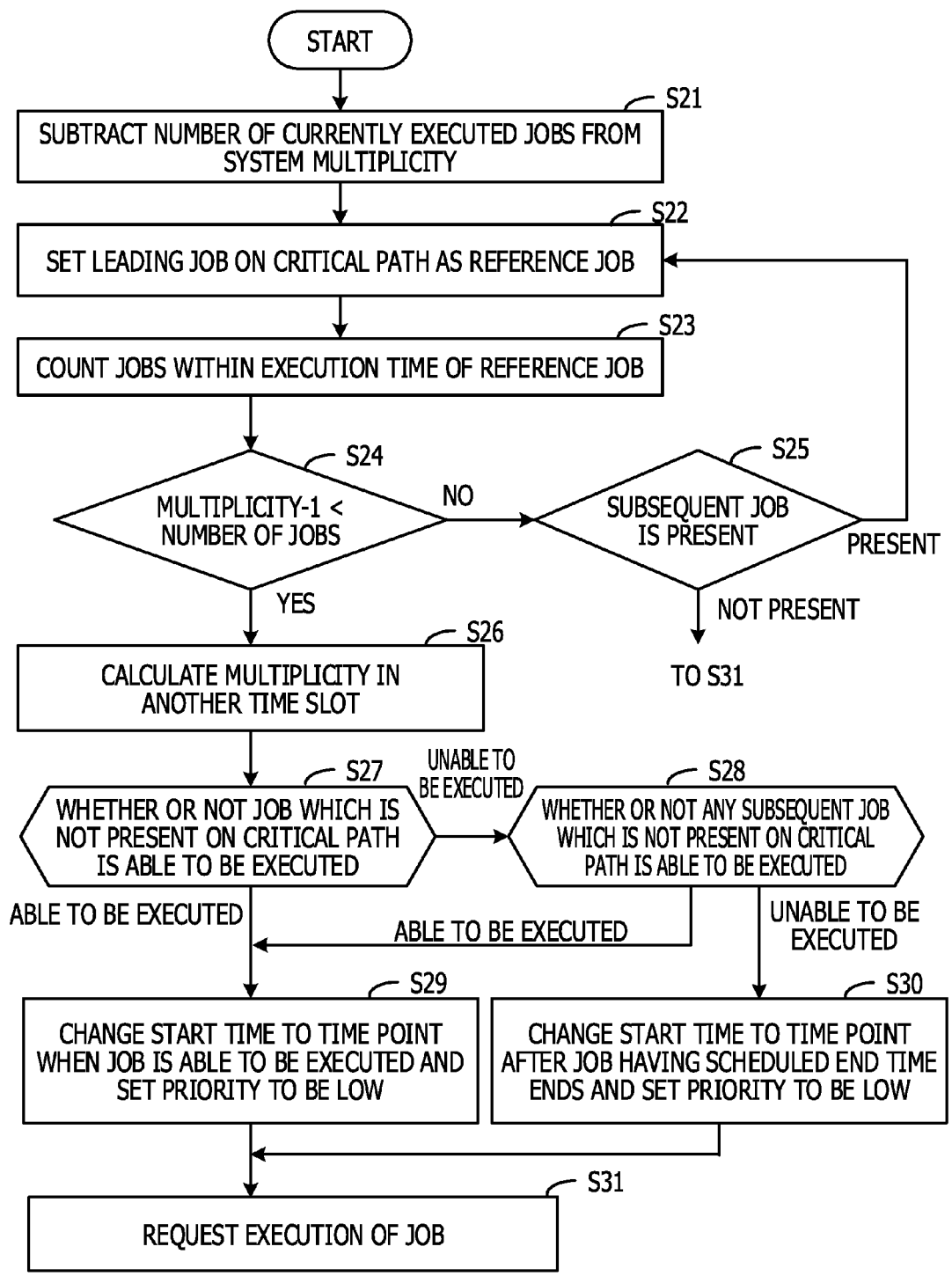
FIG. 23 is a flowchart illustrating an operation of a priority setting unit.

FIG. 23 is a flowchart illustrating an operation of the priority setting unit.

(S21) In a case where some jobs are currently executed, the priority setting unit 16 subtracts the number of the currently executed jobs from the system multiplicity.

(S22) The priority setting unit 16 identifies jobs on a critical path, and sets a leading job on the critical path as a reference job.

(S23) The priority setting unit 16 counts the number of other jobs to be executed within an execution time of the reference job. For example, in a case where an execution time of the reference job is 10 minutes and there are three jobs which are scheduled to be executed within 10 minutes, a count number is 3.

(S24) The priority setting unit 16 determines whether or not the number obtained by subtracting 1 from the system multiplicity is smaller than the count number of jobs. If (the system multiplicity−1)<(the count number of jobs), the flow proceeds to S26. If (the system multiplicity−1)≥(the count number of jobs), the flow proceeds to S25.

The condition of (the system multiplicity−1)<(the count number of jobs) indicates a case where the number of jobs that are registered to be executed within a predetermined time exceeds the system multiplicity. The condition of (the system multiplicity−1)≥(the count number of jobs) indicates a case where the number of jobs that are registered to be executed within a predetermined time is equal to or smaller than the system multiplicity.

(S25) The priority setting unit 16 determines that the reference job may be executed under the present the system multiplicity. The priority setting unit 16 sets a job which is scheduled to be executed subsequently to the reference job as a new reference job, and returns to the process in S22. If there is no subsequent job serving as the next reference job, the flow proceeds to S31.

(S26) The priority setting unit 16 obtains multiplicity of other time slots leading up to a time slot in which a job having an end time ends.

(S27) The priority setting unit 16 identifies time slots of a grace time of a job which is not present on the critical path among jobs to be executed. The priority setting unit 16 determines whether or not the job is able to be executed within the time slots based on the present the system multiplicity. If the job is unable to be executed, the flow proceeds to S28. If the job is able to be executed, the flow proceeds to S29.

(S28) The priority setting unit 16 determines whether or not the next job which is not present on the critical path is able to be executed under the system multiplicity within time slots of a grace time of the job (this process is performed on all jobs which are not present on the critical path). If the job is able to be executed in some time slots, the flow proceeds to S29. If the job is unable to be executed in any time slots, the flow proceeds to S30.

(S29) The priority setting unit 16 changes a start time of the job that is able to be executed to a time point when the job is able to be executed under the system multiplicity, and sets a priority thereof to be low.

(S30) The priority setting unit 16 changes a start time of a job which is not present on the critical path and exceeds the system multiplicity to a time point after a job having a scheduled end time ends, and sets a priority thereof to be low.

(S31) The priority setting unit 16 transmits priority information to the execution request unit 17. The execution request unit 17 outputs a job execution request based on the priority information.

Figure 24:
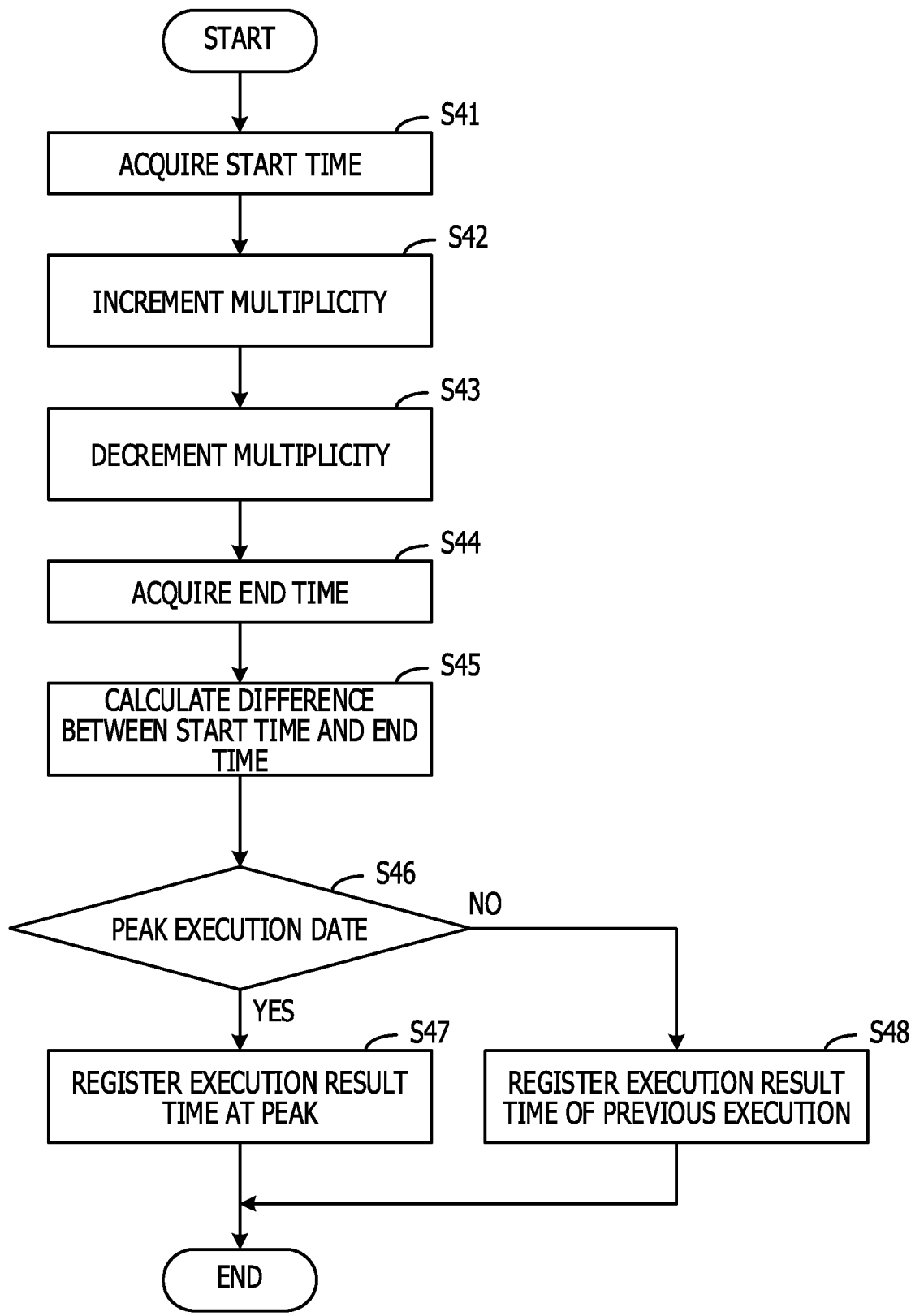
FIG. 24 is a flowchart illustrating an operation of an execution result time calculation unit.

FIG. 24 is a flowchart illustrating an operation of the execution result time calculation unit.

(S41) The execution result time calculation unit 18 acquires a start time of job execution.

(S42) The execution result time calculation unit 18 updates current multiplicity when execution of a job is started. For example, in a case where execution of job#B is started within a predetermined time in which job#A is being executed, the execution result time calculation unit 18 updates the current multiplicity by incrementing the current multiplicity from 1 to 2.

(S43) In a case where a job is executed and ended by the job execution control section 20, the execution result time calculation unit 18 updates the current multiplicity when the job ends. For example, in a case where execution of job#B ends within a predetermined time in which job#A and job#B are executed, the execution result time calculation unit 18 updates the current multiplicity by decrementing the current multiplicity from 2 to 1.

(S44) The execution result time calculation unit 18 acquires an end time of the job execution.

(S45) The execution result time calculation unit 18 calculates a difference between the start time and the end time of the job execution.

(S46) The execution result time calculation unit 18 determines whether or not the execution date of the job is the peak execution date. If the execution date is the peak execution date, the flow proceeds to S47. If the execution date is not the peak execution date, the flow proceeds to S48.

(S47) The execution result time calculation unit 18 registers "Peak exec time" in a table of the information management section 30 based on the calculated difference.

(S48) The execution result time calculation unit 18 registers "Prev exec time" in the table of the information management section 30 based on the calculated difference.

Figure 25:
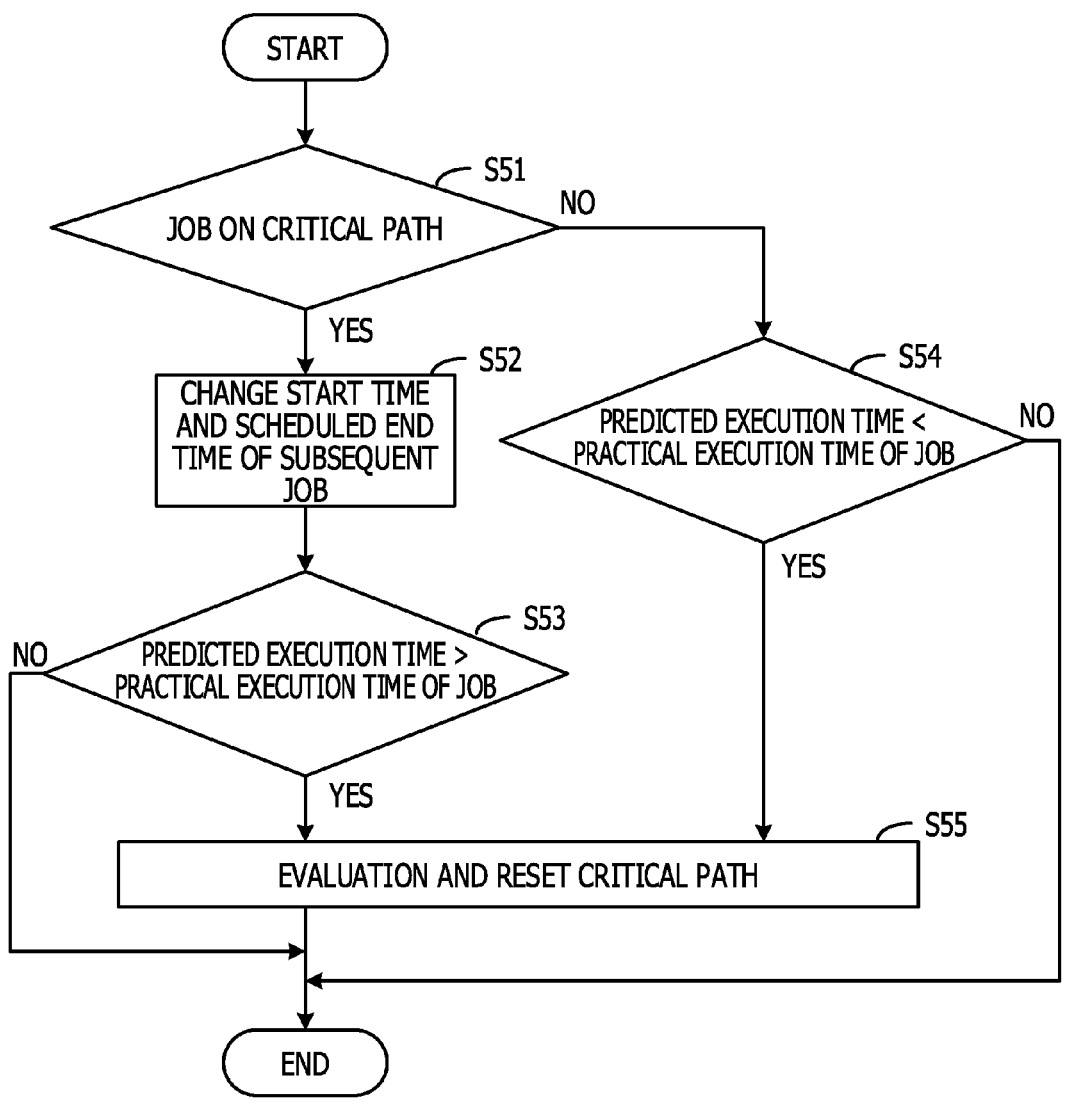
FIG. 25 is a flowchart illustrating an operation of a critical path evaluation unit.

FIG. 25 is a flowchart illustrating an operation of the critical path evaluation unit.

(S51) The critical path evaluation unit 19 determines whether or not a job registered in the job definition table T2 is a job on a critical path. If the job is a job on the critical path, the flow proceeds to S52. If the job is not a job on the critical path, the flow proceeds to S54.

(S52) The critical path evaluation unit 19 changes a start time and a scheduled end time of a subsequent job.

(S53) The critical path evaluation unit 19 determines whether or not a predicted execution time is longer than a practical execution time of the job. If the predicted execution time is longer than the practical execution time of the job, the flow proceeds to S55. If the predicted execution time is equal to or shorter than the practical execution time of the job, the process ends.

(S54) The critical path evaluation unit 19 determines whether or not the predicted execution time is shorter than a practical execution time of the job. If the predicted execution time is shorter than the practical execution time of the job, the flow proceeds to S55. If the predicted execution time is equal to or longer than the practical execution time of the job, the process ends.

(S55) The critical path evaluation unit 19 evaluates a critical path, and instructs the critical path setting unit 14 to reset the critical path.

As described above, in the present embodiment, a change in a critical path is detected, and an execution priority of a job is dynamically changed (high to low, or low to high). In resetting of a priority, a critical path is evaluated and determined.

In relation to a job which is not present on a critical path, there has been no determination reference for giving a priority to the job for execution, and it has been difficult to preliminarily estimate an influence of the job on a job which is present on the critical path. In contrast, in the present embodiment, even the job which is not present on the critical path is given a priority and is executed, and thus it is possible to avoid delay of job execution in a schedule of the entire system.

In addition, each job is set as to be executed at a high priority or as to be postponed at a low priority in a range of a system resource by adaptively feeding back progress status of a batch process when a job is executed or ends. Further, it is possible to perform job scheduling with high efficiency so as to match operation circumstances of the system which vary every moment according to progress of the batch process.

Furthermore, a variation in an execution time of a job is predicted not only by referring to previous history or predicting based on a data amount which is input immediately before, but also by taking into account a variation in the specific date (peak execution date). Therefore, a server resource may be efficiently used, and thus an execution time slot of a job may be more accurately predicted.

Figure 26:
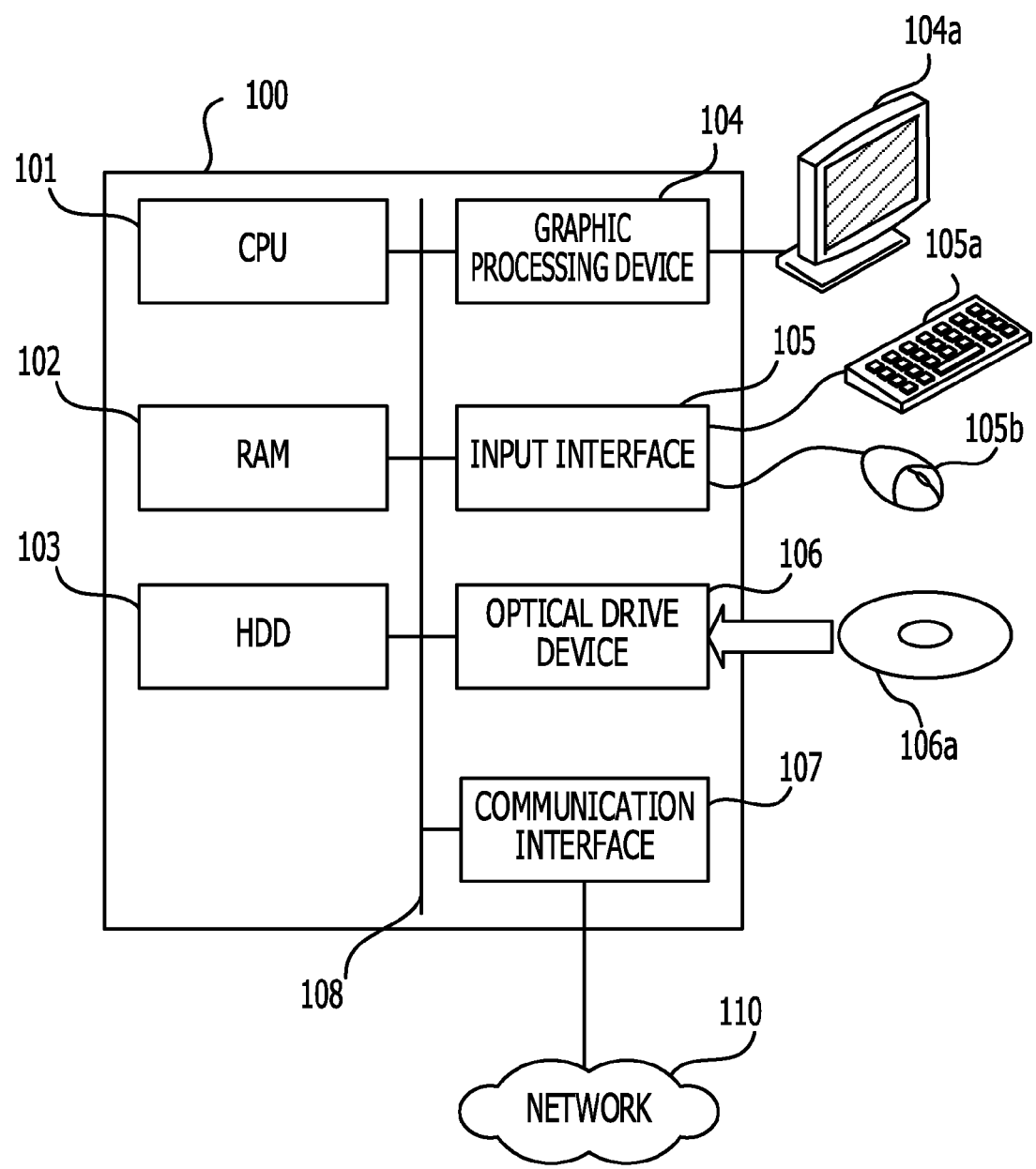
FIG. 26 is a diagram illustrating a configuration example of hardware of a computer used in an embodiment.

Next, a description will be made of a case where the present embodiment is realized by a computer. The above-described process functions may be realized by a computer. FIG. 26 is a diagram illustrating a configuration example of hardware of a computer used in the present embodiment. In a computer 100 of the information processing apparatus 1 illustrated in FIG. 1, the entire device is controlled by a central processing unit (CPU) 101. The CPU 101 is connected to a random access memory (RAM) 102 and a plurality of peripheral devices via a bus 108.

The RAM 102 is used as a main storage device of the computer 100. The RAM 102 temporarily stores at least some of programs of an OS and application programs to be executed by the CPU 101. The RAM 102 stores a variety of data which is used in a process performed by the CPU 101.

The peripheral devices connected to the bus 108 are, for example, a hard disk drive (HDD) 103, a graphic processing device 104, an input interface 105, an optical drive device 106, and a communication interface 107.

The HDD 103 magnetically writes and reads data to and from a built-in disk. The HDD 103 is used as a secondary storage device of the computer 100. The HDD 103 stores the programs of the OS, the application programs, and a variety of data. A semiconductor storage device such as a flash memory may be used as the secondary storage device.

The graphic processing device 104 is connected to a monitor 104*a*. The graphic processing device 104 displays an image on a screen of the monitor 104*a* in response to a command from the CPU 101. The monitor 104*a* is, for example, a display device using a cathode ray tube (CRT), a liquid crystal display device, or the like.

The input interface 105 is connected to a keyboard 105*a* and a mouse 105*b*. The input interface 105 transmits a signal which is sent from the keyboard 105*a* or the mouse 105*b*, to the CPU 101. The mouse 105*b* is an example of a pointing device, and other pointing devices may be used. Other pointing devices include a touch panel, a tablet, a touch pad, a track ball, and the like.

The optical drive device 106 reads data recorded on an optical disc 106*a*, by using laser light or the like. The optical disc 106*a* is a portable recording medium which records data thereon so that the data may be read by reflection of light. The optical disc 106*a* may be a digital versatile disc (DVD), a DVD-RAM, a compact disc read only memory (CD-ROM), a CD-recordable (R)/rewritable (RW), or the like.

The communication interface 107 is connected to a network 110. The communication interface 107 transmits and receives data to and from other computers or communication devices via the network 110.

With the above-described hardware configuration, the process functions of the present embodiment may be realized. In a case where the process functions of the present embodiment are realized by the computer, a program is provided which describes process content of the functions of the information processing apparatus 1 illustrated in FIG. 1.

The program is executed by the computer, and thus the above-described process functions are realized on the computer. The program describing the process content may be recorded on a computer-readable recording medium. The computer-readable recording medium may be a magnetic storage device, an optical disc, a magneto-optical recording medium, a semiconductor memory, or the like. The magnetic storage device includes an HDD, a flexible disk (FD), a magnetic tape, or the like. The optical disc includes a DVD, a DVD-RAM, a CD-ROM/RW, or the like. The magneto-optical recording medium includes a magneto-optical disk (MO), or the like. A temporary propagation signal itself is not included in a recording medium recording a program.

In a case where the program is distributed, for example, a portable recording medium such as a DVD or a CD-ROM on which the program is recorded is sold. The program may be stored in a storage device of a server computer, and the program may be transmitted from the server computer to other computers via a network.

The computer which executes the program stores, for example, the program recorded on a portable recording medium or the program transmitted from the server computer, into a storage device thereof. The computer reads the program from the storage device thereof and performs processes according to the program. Further, the computer may directly read the program from the portable recording medium, so as to perform processes according to the program. Furthermore, the computer may sequentially perform a process according to a received program each time the program is transmitted from the server computer.

At least some of the process functions may be realized by an electronic circuit such as a digital signal processor (DSP), an application specific integrated circuit (ASIC), or a programmable logic device (PLD).

As described above, according to the present embodiment, since an execution priority of a job is dynamically determined in an automatic operation of a job, a job with a high priority may be executed without delay, and thus it is possible to minimize delay of job execution.

In a system which performs an operation of various jobs, in order to predict an execution time of each job in related arts, a person in charge is desired to be well versed in content of the job or in job scheduling of an entire system.

However, in a system which performs an operation of many jobs, even just understanding content of the jobs is a large workload, and operation circumstances of the system vary every moment from circumstances in which the jobs are initially planned to be executed by delay of some jobs, or early termination of a job.

According to the present embodiment, since a priority of a job is dynamically determined and scheduling is performed, it is possible to perform scheduling without delay of job execution of an entire system even if a person in charge is not well versed in content of jobs. Even in a case where resource deficiency temporarily occurs, it is possible to reduce a delay time which occurs in a job execution time.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus, comprising:
   non-transitory computer-readable recording medium configured to store therein:
   a first execution time,
   a second execution time longer than the first execution time, the first and second execution times being different execution durations based upon different time periods expected to execute a first job included in a first job group, and
   a program; and
   at least one of a processor configured by the program or an electronic circuit configured, to:
   determine in which execution time slot, from among execution time slots, to schedule an execution start time of the first job to start execution of the first job,
   select, as a predicted execution duration of the first job, one of the first execution time and the second execution time based on the execution time slot determined to schedule the execution start time of the first job,
   schedule the first job group based on the predicted execution duration,
   set job flow information including information indicating a maximal flow of jobs to be completed within a period of time as a currently set critical path, and a predicted execution duration to execute a flow of lobs being maximal for the maximal flow among flows of scheduled jobs,
   execute lobs included in the first job group while giving a job present on the critical path a higher priority than a priority given to a job not present on the critical path,
   compare, after execution of the first job is ended, the predicted execution duration of the first job with an execution time taken for the execution of the first job, and
   evaluate, based on a result of the comparison, whether the currently set critical path is still maximal to set a new critical path.

2. The information processing apparatus according to claim 1, wherein
   the different time periods include a first time period and a second time period different from the first time period, and
   the at least one of the processor or the electronic circuit is further configured to:
   select, as the predicted execution duration, the first execution time in a case where the execution start time is included in the first time period, and
   select, as the predicted execution duration, the second execution time in a case where the execution start time is included in the second time period.

3. The information processing apparatus according to claim 2, wherein the at least one of the processor or the electronic circuit is further configured to:
   receive information indicating the different time periods including peak execution date information set by a user, the peak execution date information indicating a peak day on which business is busier than on a normal day,
   set the normal day as the first time period,
   set the peak day as the second time period,
   set, as the first execution time, a first execution duration for execution of the first job on a previous normal day, and
   set, as the second execution time, a second execution duration longer than the first amount of time.

4. The information processing apparatus according to claim 1, wherein the at least one of the processor or the electronic circuit is further configured to:
   perform the evaluation in a case where
   the first job is present on the critical path and
   the result of the comparison indicates that the practical execution time is shorter than the predicted execution duration.

5. The information processing apparatus according to claim 4, wherein the at least one of the processor or the electronic circuit is further configured to:
   determine, with regard to the first job group except for completed jobs, a maximal flow of jobs after the execution of the first job is ended, execution of the completed jobs having being ended when the execution of the first job is ended, and
   set the determined maximal flow as the new critical path in a case where the determined maximal flow is not included in the currently set critical path.

6. The information processing apparatus according to claim 1, wherein the at least one of the processor or the electronic circuit is further configured to:
   perform the evaluation in a case where
   the first job is not present on the critical path and
   the result of the comparison indicates that the practical execution time is longer than the predicted execution duration.

7. The information processing apparatus according to claim 6, wherein the at least one of the processor or the electronic circuit is further configured to:
- determine, with regard to the first job group except for completed jobs, a maximal flow of jobs after the execution of the first job is ended, execution of the completed jobs having being ended when the execution of the first job is ended, and
- set the determined maximal flow as the new critical path in a case where the determined maximal flow is not included in the currently set critical path.

8. The information processing apparatus according to claim 1, wherein the at least one of the processor or the electronic circuit is further configured to:
- determine, for the schedule of the first job group, whether a number of jobs scheduled to be executed in a first time slot exceeds a set job multiplicity for the information processing apparatus, and
- reschedule a second job to be executed in a second time slot, the second job not being present on the critical path, the second job being currently scheduled to be executed in the first time slot, a number of jobs scheduled to be executed in the second time slot not exceeding the set multiplicity even if the second job is to be executed in the second time slot, the second time slot being included in an entire predicted execution duration of the critical path.

9. A job scheduling method, comprising:
performing by at least one computer:
- storing in at least one memory, a first execution time and a second execution time longer than the first execution time, the first and second execution times being different execution durations based upon different time periods expected to execute a first job included in a first job group;
- determining in which execution time slot, from among execution time slots, to schedule an execution start time of the first job to start execution of the first job;
- selecting, as a predicted execution duration of the first job, one of the first execution time and the second execution time based on the execution time slot determined to schedule the execution start time of the first job;
- schedule the first job group based on the predicted execution duration,
- set job flow information including information indicating a maximal flow of jobs to be completed within a period of time as a currently set critical path, and a predicted execution duration to execute a flow of lobs being maximal for the maximal flow among flows of scheduled jobs;
- execute lobs included in the first job group while giving a job present on the critical path a higher priority than a priority given to a job not present on the critical path;
- compare, after execution of the first job is ended, the predicted execution duration of the first job with an execution time taken for the execution of the first job; and
- evaluate, based on a result of the comparison, whether the currently set critical path is still maximal to set a new critical path.

10. A non-transitory computer-readable recording medium having stored therein a program for causing a computer to execute a process, the process comprising:
- storing in at least one memory, a first execution time and a second execution time longer than the first execution time, the first and second execution times being different execution durations based upon different time periods expected to execute a first job included in a first job group;
- determining in which execution time slot, from among execution time slots, to schedule an execution start time of the first job to start execution of the first job;
- selecting, as a predicted execution duration of the first job, one of the first execution time and the second execution time based on the execution time slot determined to schedule the execution start time of the first job;
- scheduling the first job group based on the predicted execution duration,
- setting job flow information including information indicating a maximal flow of lobs to be completed within a period of time as a currently set critical path, and a predicted execution duration to execute a flow of lobs being maximal for the maximal flow among flows of scheduled jobs;
- executing lobs included in the first job group while giving a job present on the critical path a higher priority than a priority given to a job not present on the critical path;
- comparing, after execution of the first job is ended, the predicted execution duration of the first job with an execution time taken for the execution of the first job; and
- evaluating, based on a result of the comparing, whether the currently set critical path is still maximal to set a new critical path.

* * * * *